US012457643B2

(12) United States Patent
Wang et al.

(10) Patent No.: US 12,457,643 B2
(45) Date of Patent: Oct. 28, 2025

(54) MULTI-AP SETUP AND TRANSMISSION PROCEDURES FOR WLAN SYSTEMS

(71) Applicant: INTERDIGITAL PATENT HOLDINGS, INC., Wilmington, DE (US)

(72) Inventors: Xiaofei Wang, North Caldwell, NJ (US); Hanqing Lou, Syosset, NY (US); Li Hsiang Sun, San Diego, CA (US); Mahmoud Saad, Montreal (CA); Rui Yang, Greenlawn, NY (US); Ushasi Ghosh, Los Angeles, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 402 days.

(21) Appl. No.: 18/023,515

(22) PCT Filed: Sep. 1, 2021

(86) PCT No.: PCT/US2021/048730
§ 371 (c)(1),
(2) Date: Feb. 27, 2023

(87) PCT Pub. No.: WO2022/051408
PCT Pub. Date: Mar. 10, 2022

(65) Prior Publication Data
US 2023/0319886 A1    Oct. 5, 2023

Related U.S. Application Data

(60) Provisional application No. 63/077,994, filed on Sep. 14, 2020, provisional application No. 63/073,200, filed on Sep. 1, 2020.

(51) Int. Cl.
*H04W 74/0816*    (2024.01)
*H04L 5/00*    (2006.01)

(52) U.S. Cl.
CPC ....... *H04W 74/0816* (2013.01); *H04L 5/0035* (2013.01)

(58) Field of Classification Search
None
See application file for complete search history.

(56) References Cited

U.S. PATENT DOCUMENTS 10,820,332 B2 * 10/2020 Zhou ................ H04B 7/0413
11,129,194 B2    9/2021 Lou et al.
(Continued)

FOREIGN PATENT DOCUMENTS

WO    2019/213565    11/2019
WO    2020097487 A1    5/2020

OTHER PUBLICATIONS

AU, "Compendium of straw polls and potential changes to the Specification Framework Document," IEEE 802.11-20/0566r59 (Aug. 20, 2020).
(Continued)

Primary Examiner — Otis L Thompson, Jr.
(74) Attorney, Agent, or Firm — Volpe Koenig

(57) ABSTRACT

Methods and apparatuses are described herein for multiple-access point (multi-AP) sounding procedures in a wireless local area network (WLAN). A coordinating AP (CAP) may receive, from one or more member APs in a multi-AP set (MAPS), one or more indications indicating that the one or more member APs are capable of multi-AP sounding during a transmission opportunity (TXOP). The CAP may transmit a CAP TXOP indication (CTI) frame indicating that the multi-AP sounding is to be performed during a TXOP acquired by the CAP. The CAP may receive a CAP TXOP request (CTR) frame indicating that the one or more member APs of the MAP are willing to perform multi-AP sounding during the TXOP. The CAP may transmit a CAP TXOP AP schedule (CTAS) frame indicating a transmission schedule
(Continued)

for one or more sounding frames to be transmitted by the one or more member APs during the TXOP.

16 Claims, 23 Drawing Sheets

(56) References Cited

U.S. PATENT DOCUMENTS

| | | | | |
|---|---|---|---|---|
| 11,477,800 | B2* | 10/2022 | Zhou | H04B 7/0413 |
| 2007/0111666 | A1* | 5/2007 | Waxman | H04B 7/0634 |
| | | | | 455/67.7 |
| 2014/0056204 | A1* | 2/2014 | Suh | H04W 72/541 |
| | | | | 370/312 |
| 2015/0156794 | A1* | 6/2015 | Kwon | H04L 25/0224 |
| | | | | 370/329 |
| 2015/0270879 | A1* | 9/2015 | Chen | H04L 27/2646 |
| | | | | 375/267 |
| 2015/0270880 | A1* | 9/2015 | Harel | H04B 7/0452 |
| | | | | 370/338 |
| 2015/0295629 | A1* | 10/2015 | Xia | H04B 7/0695 |
| | | | | 370/329 |
| 2016/0197655 | A1* | 7/2016 | Lee | H04W 48/00 |
| | | | | 370/338 |
| 2016/0380730 | A1* | 12/2016 | Ghosh | H04L 25/0224 |
| | | | | 370/329 |
| 2018/0054794 | A1* | 2/2018 | Cariou | G01S 5/0236 |
| 2018/0206274 | A1* | 7/2018 | Cherian | H04B 7/0417 |
| 2018/0234135 | A1* | 8/2018 | Vermani | H04W 72/29 |
| 2018/0263043 | A1* | 9/2018 | Zhou | H04W 72/12 |
| 2019/0028168 | A1* | 1/2019 | Vermani | H04B 7/0617 |
| 2019/0132762 | A1* | 5/2019 | Zhu | H04B 7/024 |
| 2020/0037275 | A1* | 1/2020 | Liu | H04L 5/0048 |
| 2020/0045555 | A1* | 2/2020 | Huang | H04W 72/20 |
| 2020/0059808 | A1* | 2/2020 | Lim | H04W 72/04 |
| 2020/0076665 | A1* | 3/2020 | Porat | H04B 7/024 |
| 2020/0084712 | A1* | 3/2020 | Wu | H04B 7/0608 |
| 2020/0112350 | A1 | 4/2020 | Yang et al. | |
| 2020/0137704 | A1* | 4/2020 | Vermani | H04L 5/0053 |
| 2020/0213160 | A1* | 7/2020 | Doostnejad | H04L 25/022 |
| 2020/0274588 | A1* | 8/2020 | Jiang | H04B 7/024 |
| 2020/0336176 | A1* | 10/2020 | Seok | H04B 7/0626 |
| 2020/0403680 | A1* | 12/2020 | Li | H04B 7/0695 |
| 2021/0044333 | A1* | 2/2021 | Jiang | H04B 7/0619 |
| 2021/0075580 | A1* | 3/2021 | Thubert | H04W 72/542 |
| 2021/0126686 | A1* | 4/2021 | Feng | H04B 7/063 |
| 2021/0152396 | A1* | 5/2021 | Cherian | H04B 7/0452 |
| 2021/0218531 | A1* | 7/2021 | Ouchi | H04L 5/0053 |
| 2021/0307099 | A1* | 9/2021 | Ryu | H04W 76/15 |
| 2021/0409179 | A1* | 12/2021 | Yang | H04L 5/0094 |
| 2022/0038241 | A1* | 2/2022 | Vermani | H04L 5/001 |
| 2022/0140879 | A1* | 5/2022 | Liang | H04B 7/063 |
| | | | | 375/267 |
| 2022/0150819 | A1* | 5/2022 | Park | H04W 72/12 |
| 2023/0107240 | A1* | 4/2023 | Sundman | H04B 7/0697 |
| | | | | 370/329 |
| 2023/0261699 | A1* | 8/2023 | Seok | H04L 5/0023 |
| | | | | 375/267 |
| 2024/0121143 | A1* | 4/2024 | Huang | H04L 27/2602 |
| 2024/0381155 | A1* | 11/2024 | Zhou | H04B 17/318 |

OTHER PUBLICATIONS

AU, "Specification Framework for TGbe," 802.11-19/1262r8 (Feb. 2020).
Cariou, "802.11 EHT Proposed PAR," IEEE P802.11 Wireless LANs, IEEE 802.11-18/1231r4 (Jan. 2019).
Cariou, "IEEE 802.11 EHT draft Proposed CSD," IEEE P802.11 Wireless LANs, IEEE 802.11-18/1233r4 (Jan. 2019).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely High throughput (EHT), IEEE 802.11be/D0.1 (Sep. 2020).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely High throughput (EHT), IEEE 802.11be/D1.2 (Sep. 2021).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D6.0 (Nov. 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
Jia et al., "Multi-AP Sounding Discussion," IEEE 802.11-20/0052 (Dec. 30, 2019).
Khorov et al., "Current Status and Directions of IEEE 802.11be, the Future Wi-Fi 7," IEEE Access, vol. 9 (May 2020).
Verma et al., "Coordinated AP Time/Frequency Sharing in a Transmit Opportunity in 11be," IEEE 802.11-19/1582r1 (Nov. 2019).
Yu et al., "Sounding procedure in AP collaboration," IEEE 802.11-19/1097r0 (Jul. 2019).

\* cited by examiner

MULTI-AP SETUP AND TRANSMISSION PROCEDURES FOR WLAN SYSTEMS

CROSS-REFERENCE TO RELATED APPLICATIONS

This application is the U.S. National Stage, under 35 U.S.C. § 371, of International Application No. PCT/US2021/048730 filed Sep. 1, 2021, which claims the benefit of U.S. Provisional Application No. 63/073,200 filed Sep. 1, 2020 and U.S. Provisional Application No. 63/077,994 filed Sep. 14, 2020, the contents of which are incorporated herein by reference.

BACKGROUND

In order to conduct coordinated multiple access point (AP) transmissions, such as coordinated orthogonal frequency division multiple access (OFDMA), coordinated spatial reuse (SR), joint transmission, and coordinated beamforming, it is important to be able to conduct sounding from multiple APs concurrently. The coordinated multi-AP transmission schemes will not function without concurrent multiple AP sounding from the multiple APs. Currently, such a concurrent multi-AP sounding protocol has not been defined.

SUMMARY

Methods and apparatuses are described herein for multiple-access point (multi-AP) sounding procedures in a wireless local area network (WLAN). For example, a coordinating AP (CAP) may receive, from one or more member APs in a multi-AP set (MAPS), one or more indications indicating that the one or more member APs are capable of multi-AP sounding during a transmission opportunity (TXOP). The CAP may transmit, to the one or more member APs, a CAP TXOP indication (CTI) frame indicating that the multi-AP sounding is to be performed during a TXOP acquired by the CAP. The CAP may receive, from the one or more member APs in the MAPS, a CAP TXOP request (CTR) frame indicating that the one or more member APs of the MAP are willing to perform multi-AP sounding during the TXOP acquired by the CAP. The CAP may transmit, to the one or more member APs, a CAP TXOP AP schedule (CTAS) frame indicating a transmission schedule for one or more sounding frames to be transmitted by the one or more member APs to one or more stations (STAs) associated with the one or more member APS during the TXOP for the multi-AP sounding.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
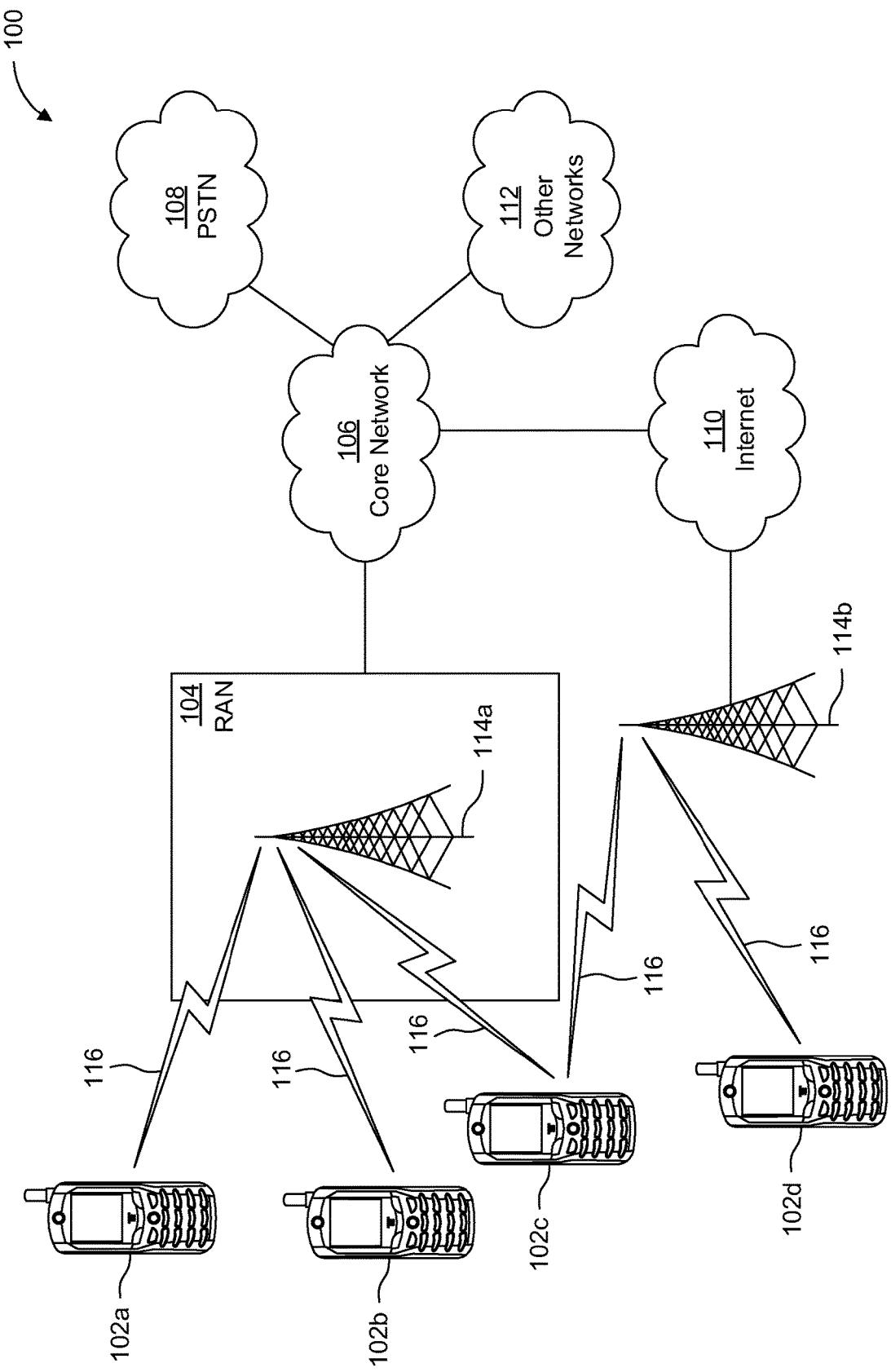
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
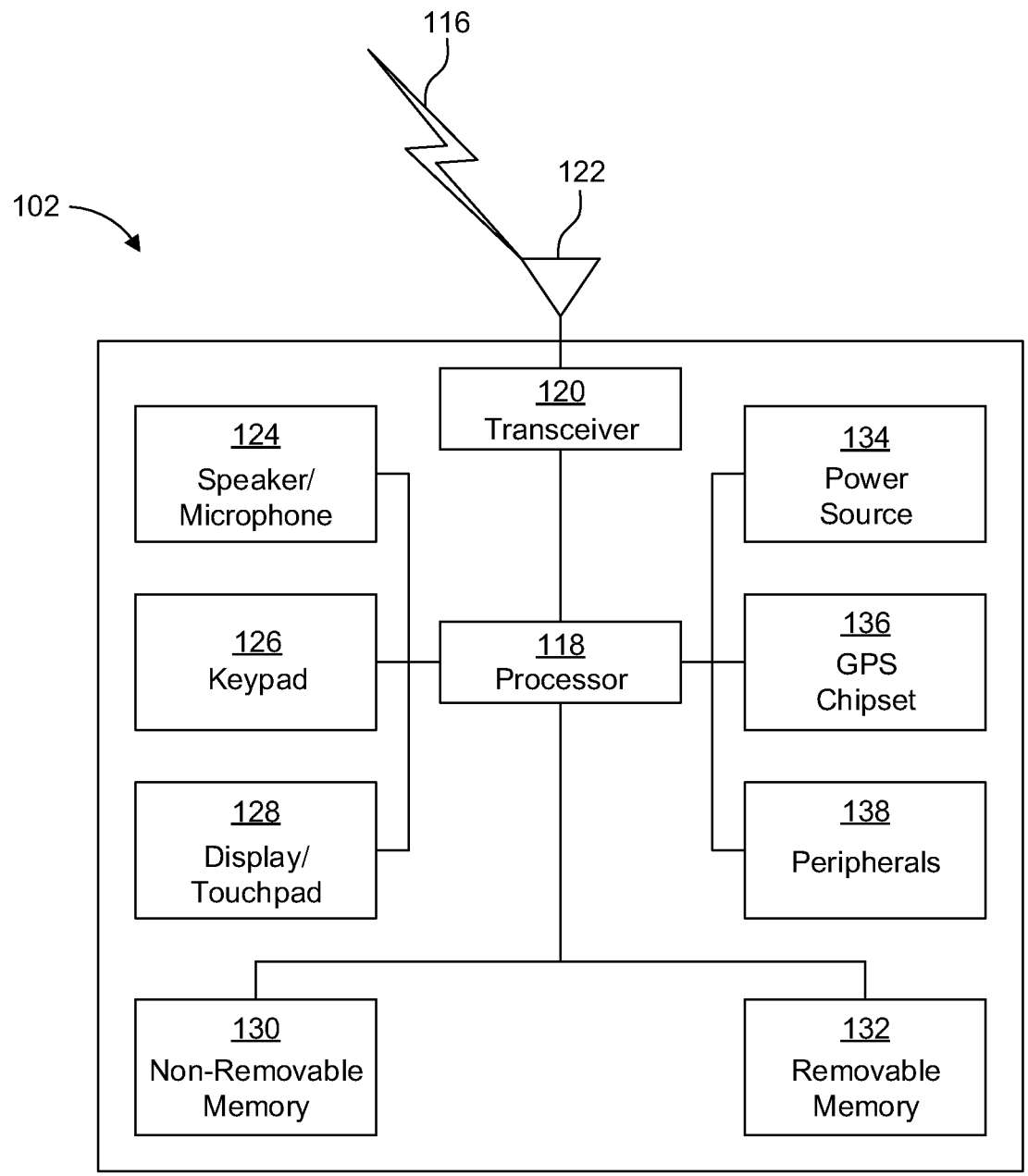
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
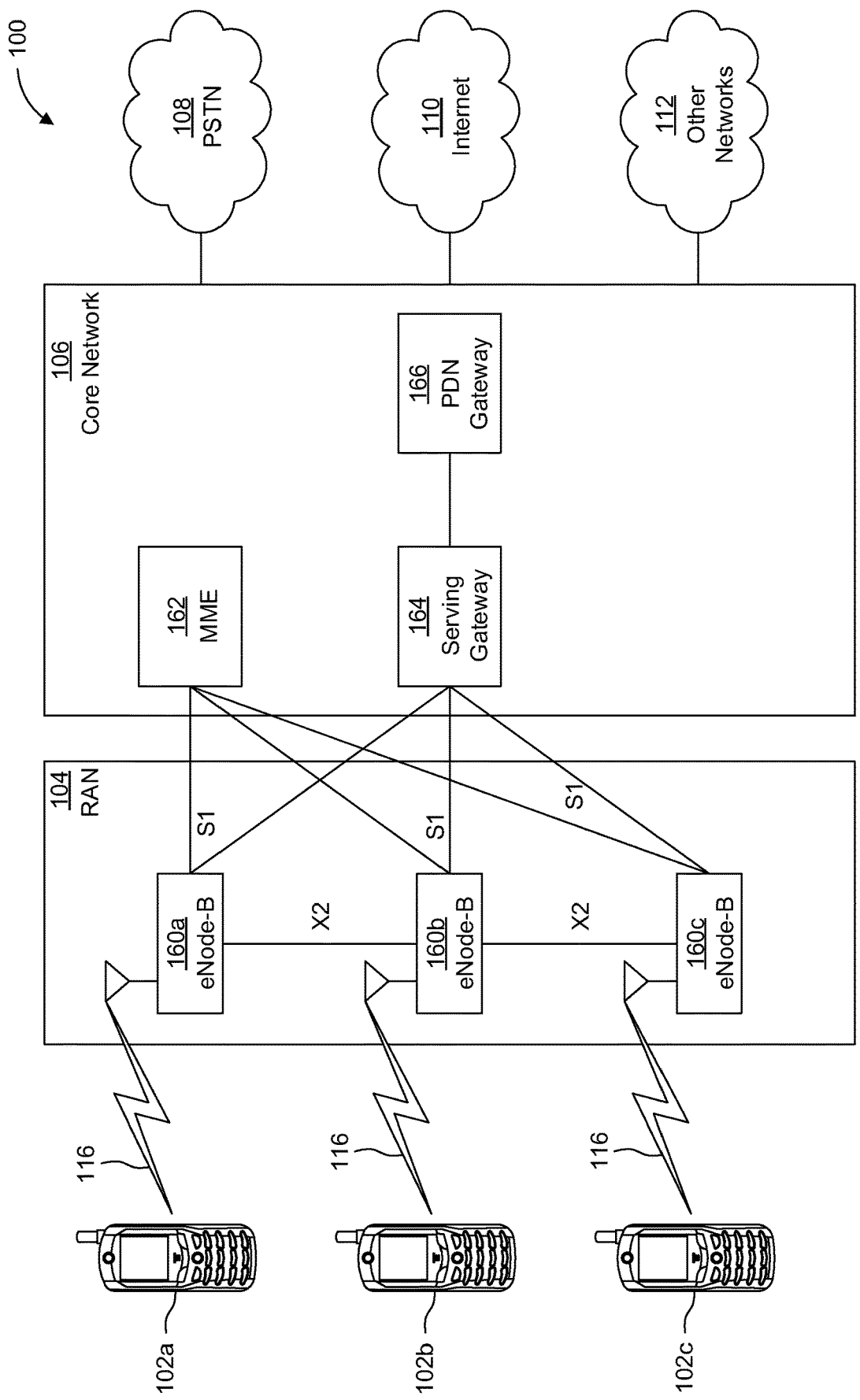
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
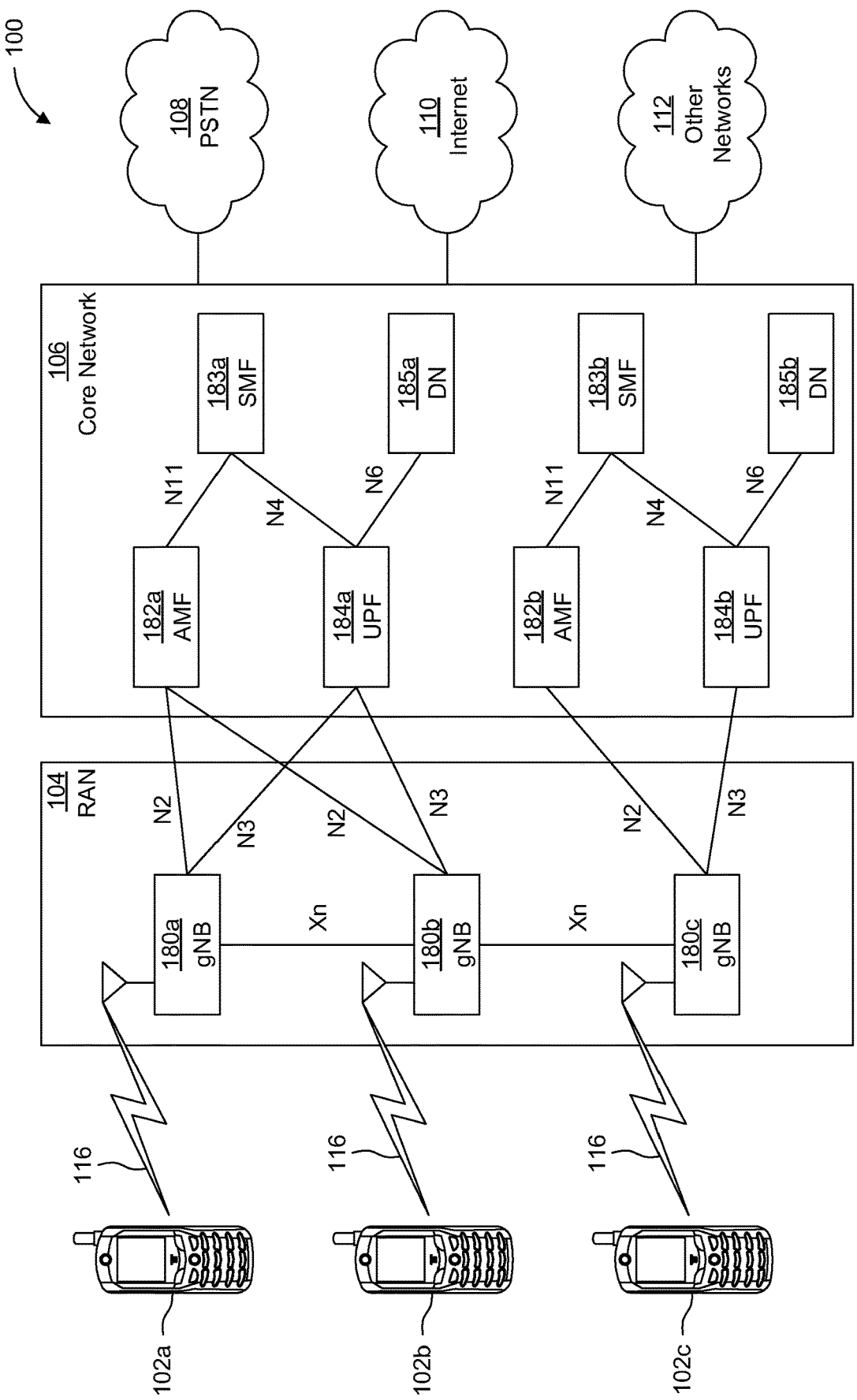
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA.

Using the 802.11ac infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. IFFT, and time domain, processing are done on each stream separately. The streams are then mapped on to the two channels, and the data is transmitted. At the receiver, this mechanism is reversed, and the combined data is sent to the MAC.

To improve spectral efficiency 802.11ac has introduced the concept for downlink Multi-User MIMO (MU-MIMO) transmission to multiple STA's in the same symbol's time frame, for example, during a downlink OFDM symbol. The potential for the use of downlink MU-MIMO is also currently considered for 802.11ah. It is noted that since downlink MU-MIMO, as it is used in 802.11ac, uses the same symbol timing to multiple STA's interference of the waveform transmissions to multiple STA's is not an issue. However, all STA's involved in MU-MIMO transmission with the AP may need to use the same channel or band, this limits the operating bandwidth to the smallest channel bandwidth that is supported by the STA's which are included in the MU-MIMO transmission with the AP.

802.11ax defines a physical layer specification and medium access control layer specification that enables High Efficiency (HE) operation for 802.11 devices. 802.11ax is considered a next main generation of Wi-Fi after 802.11ac. 11 ax defined new numerology with smaller subcarrier spacing. DL/UL OFDMA is introduced in 11 ax to achieve better spectrum efficiency.

In IEEE 802.11ax, four PPDU formats are supported: HE SU PPDU, HE MU PPDU, HE ER PPDU, and HE TB PPDU.

Figure 2A:
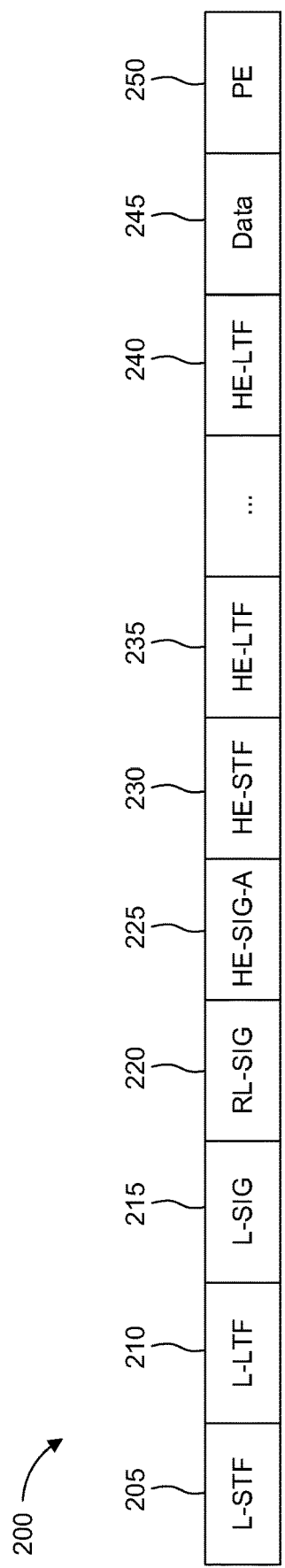
FIG. 2A is a diagram illustrating an example High Efficiency (HE) Single User (SU) Physical Layer Convergence Procedure (PLCP) Protocol Data Unit (HE SU PPDU)

FIG. 2A illustrates an example High Efficiency (HE) Single User (SU) Physical Layer Convergence Procedure (PLCP) Protocol Data Unit (HE SU PPDU) 200, which may be used in combination with any of other embodiments described herein. As illustrated in FIG. 2A, the HE SU PPDU may include, but are not limited to, L-STF 205, L-LTF 210, L-SIG 215, RL-SIG 220, HE-SIG-A 225, HE-STF 230, HE-LTFs 235, 240, data 245, and PE 250. The HE SU PPDU format 200 may be used for single user transmission.

Figure 2B:
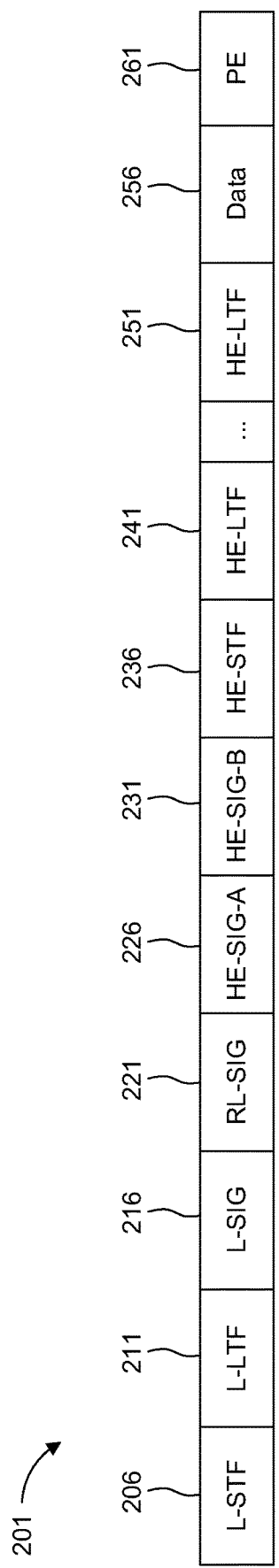
FIG. 2B is a diagram illustrating an example High Efficiency (HE) Multiple User (MU) Physical Layer Convergence Procedure (PLCP) Protocol Data Unit (HE MU PPDU)

FIG. 2B illustrates an example High Efficiency (HE) Multiple User (MU) Physical Layer Convergence Procedure (PLCP) Protocol Data Unit (HE MU PPDU) 201, which may be used in combination with any of other embodiments described herein. As illustrated in FIG. 2B, the HE MU PPDU may include, but are not limited to, L-STF 206, L-LTF 211, L-SIG 216, RL-SIG 221, HE-SIG-A 226, HE-SIG-B 231, HE-STF 236, HE-LTFs 241, 251, Data 256, and PE 261. The HE MU PPDU format 201 may be used for transmissions to one or more users if the PPDU is not a response of a Trigger frame. HE-SIG-B field 231 presents in this PPDU format.

Figure 2C:
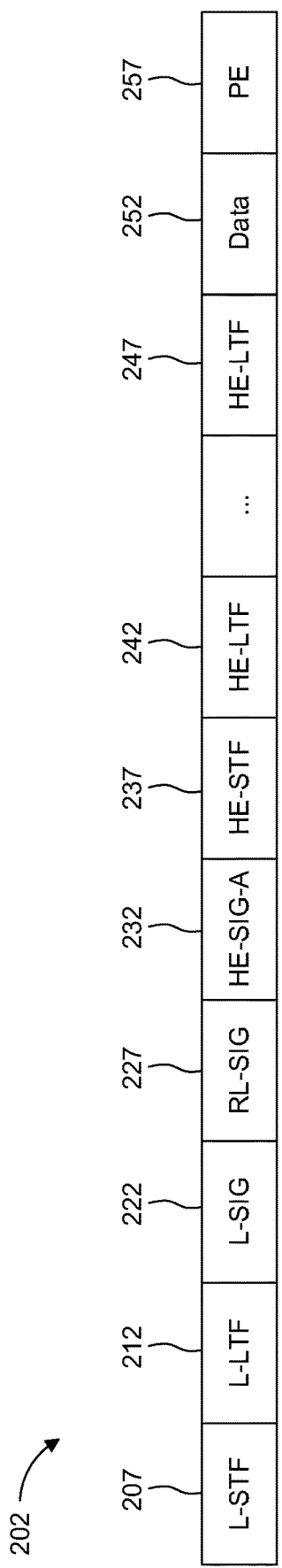
FIG. 2C is a diagram illustrating an example High Efficiency (HE) Extended Range (ER) Single User (SU) Physical Layer Convergence Procedure (PLCP) Protocol Data Unit (HE SU PPDU)

FIG. 2C illustrates an example High Efficiency (HE) Extended Range (ER) Single User (SU) Physical Layer Convergence Procedure (PLCP) Protocol Data Unit (HE SU PPDU) 202, which may be used in combination with any of other embodiments described herein. As illustrated in FIG. 2C, the HE ER SU PPDU may include, but are not limited to, L-STF 207, L-LTF 212, L-SIG 222, RL-SIG 227, HE-SIG-A 232, HE-STF 237, HE-LTFs 242, 247, Data 252, and PE 257. The HE ER SU PPDU format 202 may be used for SU transmission with extended range. In this format, the HE-SIG-A field 232 is twice as long as the HE-SIG-A field in other HE PPDU.

Figure 2D:
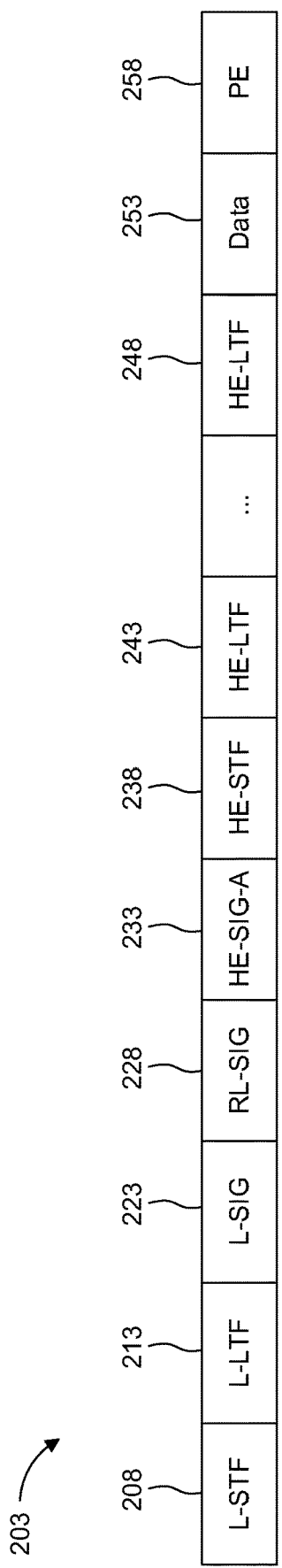
FIG. 2D is a diagram illustrating an example High Efficiency (HE) Trigger Based (TB) Physical Layer Convergence Procedure (PLCP) Protocol Data Unit (HE TB PPDU)

FIG. 2D illustrates an example High Efficiency (HE) Trigger Based (TB) Physical Layer Convergence Procedure (PLCP) Protocol Data Unit (HE TB PPDU) 203, which may be used in combination with any of other embodiments described herein. As illustrated in FIG. 2D, the HE TB PPDU may include, but are not limited to, L-STF 208, L-LTF 213, L-SIG 223, RL-SIG 228, HE-SIG-A 233, HE-STF 238, HE-LTF 243, 248, Data 253, and PE 258. The HE TB PPDU format 203 may be used for a transmission that is a response to the Trigger frame or a frame carrying a TRS control subfield from an AP. The duration of the HE-STF field 238 in the HE TB PPDU 203 is 8 µs, doubled size of that in other HE PPDU.

L-SIG field, HE-SIG-A field and HE-SIG-B field may carry PHY layer control information for the PPDU. L-SIG field may be with legacy numerology and format, so that all the STAs understand L-SIG field. HE-SIG-A field and HE-SIG-B field may be understood by HE STAs. L-SIG fields are given in Table 1. HE-SIG-A fields for different PPDU formats are given in Table 2.

TABLE 1

L-SIG fields

| field | bits |
|---|---|
| Rate | 4 |
| Length | 12 |
| CRC | 1 |
| Tail | 6 |

TABLE 2

HE-SIG-A fields with different PPDU

| HE SU PPDU and HE ER SU PPDU | | HE MU PPDU | | HE TB PPDU | |
|---|---|---|---|---|---|
| field | bits | field | bits | field | bits |
| format | 1 | UL/DL | 1 | Format | 1 |
| Beam change | 1 | SIGB MCS | 3 | BSS Color | 6 |
| UL/DL | 1 | SIGB DCM | 1 | Spatial Reuse 1 | 4 |
| MCS | 4 | BSS Color | 6 | Spatial Reuse 2 | 4 |
| DCM | 1 | Spatial Reuse | 4 | Spatial Reuse 3 | 4 |
| BSS color | 6 | Bandwidth | 3 | Spatial Reuse 4 | 4 |
| Reserved | 1 | # of SIGB Symbols or MU-MIMO users' | 4 | Reserved | 1 |
| Spatial Reuse | 4 | SIGB Compression | 1 | Bandwidth | 2 |
| Bandwidth | 2 | GI + LTF size | 2 | TXOP | 7 |
| GI + LTF | 2 | Doppler | 1 | Reserved | 9 |
| NSTS and Midamble Periodicity | 3 | TXOP | 7 | CRC | 4 |
| TXOP | 7 | Reserved | 1 | Tail | 6 |
| Coding | 1 | # of HE-LTF symbols and midamble periodicity | 3 | | |
| LDPC Extra Symbol Segment | 1 | LDPC extra symbol segment | 1 | | |
| STBC | 1 | STBC | 1 | | |
| Beam formed | 1 | Pre-FEC Padding factor | 2 | | |
| Pre-FEC Padding Factor | 2 | PE disambiguity | 1 | | |
| PE Disambiguity | 1 | CRC | 4 | | |
| Reserved | 1 | Tail | 6 | | |
| Doppler | 1 | | | | |
| CRC | 4 | | | | |
| Tail | 6 | | | | |

Coordinated multi-AP (C-MAP) transmissions may be supported in the IEEE 802.11be. The schemes may include, but are not limited to: Coordinated Multi-AP OFDMA, Coordinated Multi-AP TDMA, Coordinated Multi-AP Spatial Reuse, Coordinated beamforming/nulling and/or Joint Transmission. These schemes may include a joint NDP sounding for C-MAP (e.g., sequential sounding).

In one embodiment, 802.11be may include a mechanism to determine whether an AP is part of an AP candidate set and can participate as a shared or member AP in coordinated AP transmission initiated by a sharing or coordinated AP. A procedure may be defined for an AP to share its transmission resources (e.g., frequency and/or time) of an obtained TXOP with a set of APs. An AP that intends to use the resource (e.g., frequency or time) shared by another AP may be able to indicate its needs for the resource to the AP that shared the resource. Coordinated OFDMA may be supported in 802.11be, and in a coordinated OFDMA, both DL OFDMA and its corresponding UL OFDMA acknowledgement may be allowed.

Channel sounding, for example, in 802.11n and 802.11ac, may be performed using two different schemes, explicit or implicit. In explicit channel sounding, the AP transmits a null data packet (NDP) to the STA with a preamble that allows the STA to measure its own channel and send CSI feedback to the AP. In implicit channel sounding, the STA sends an NDP and the AP measures the channel of the STA assuming that the channel is reciprocal.

802.11be may support a maximum of 16 spatial streams for SU-MIMO and for MU-MIMO where the maximum number of spatial streams allocated to each MU-MIMO scheduled non-AP STA is limited to 4.

The maximum number of users spatially multiplexed for DL transmissions may be 8 per RU/MRU.

802.11be may support two modes of channel sounding in multiple APs: sequential sounding and joint sounding. In sequential sounding, each AP may transmit an NDP independently without overlapped sounding period of each AP. Also, joint sounding may also be provided as optional mode for multiple APs, where less or equal to total 8 antennas at AP has all antennas active on all LTF tones and uses 82.11ax P-matrix across OFDM symbols.

The CSI feedback collection can be performed using 802.11ax-like 4 step sounding sequence (NDPA+NDP+BFRP TF+CSI report) in Multiple-AP to collect the feedback from both in-BSS STAs and OBSS STAs.

In sequential sounding for multiple APs, a STA can process an NDPA frame and the BFRP Trigger frame received from the OBSS AP and the STA can respond with the corresponding CSI to the OBSS AP, if polled by the BFRP TF from the OBSS AP.

Figure 3:
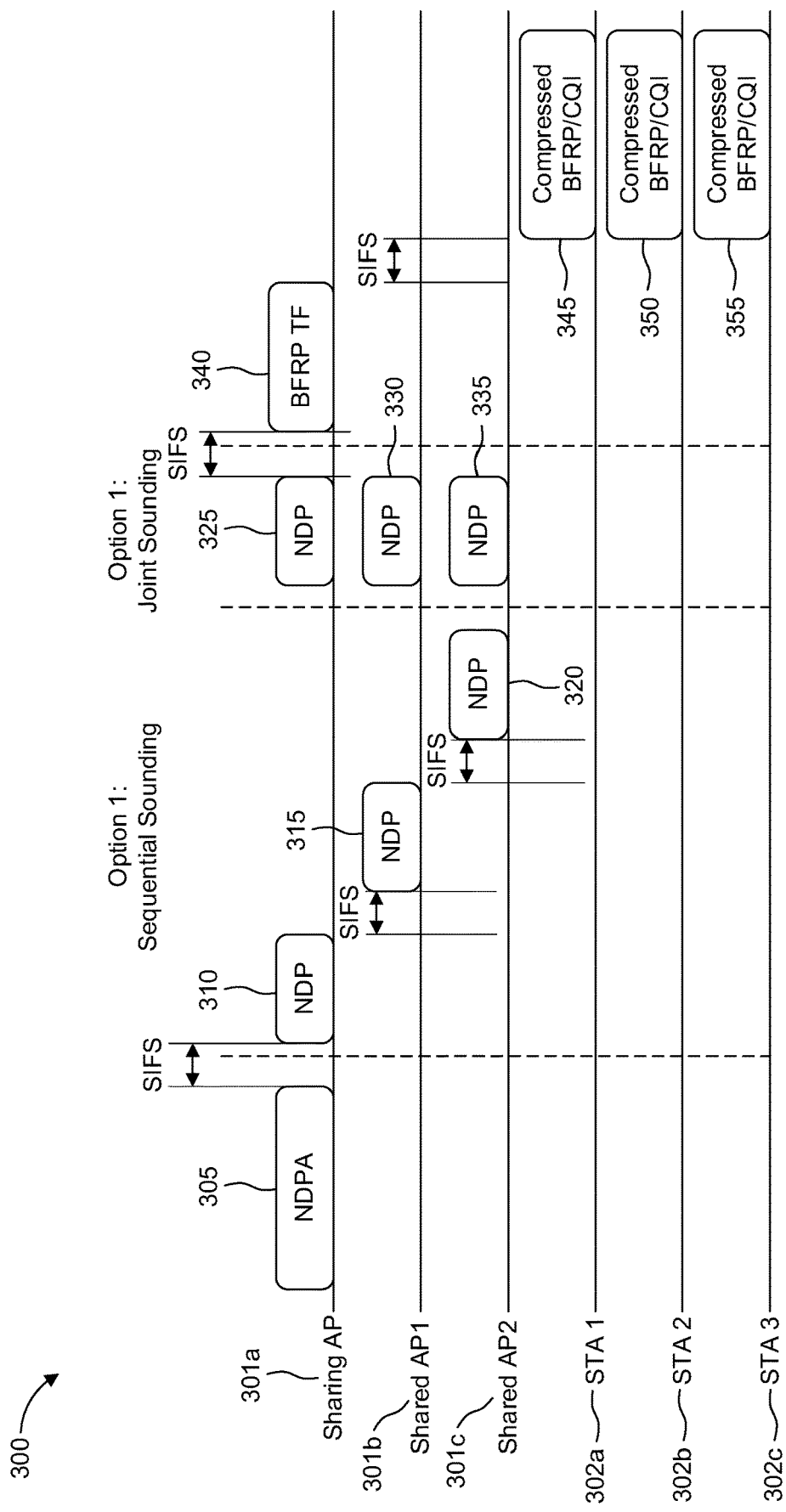
FIG. 3 is a diagram illustrating an example sequential versus joint channel sounding in multiple APs.

FIG. 3 illustrates an example sequential versus joint channel sounding 300 in multiple APs, which may be used in combination with any of other embodiments described herein. As illustrated in FIG. 3, the sharing AP 301a may transmit an NDPA frame to the shared APs 1-2 301b, 301c. In sequential sounding, each AP (i.e., sharing AP 301a, shared AP 1 301b, shared AP 2 301c) in the coordinating group or multi-AP set (MAPS) may transmit an NDP 310, 315, 320 in a different non-overlapped time to all the STAs 302a, 302b, 302c in the coordinating group or MAPS (i.e., time-multiplexed). In joint sounding, the sharing AP 301a and shared APs 1-2 301b, 301c can transmit the NDP frames 325, 330, 335 simultaneously where different LTF tones are either spanning the entire bandwidth and multiplexed spatially or using orthogonal codes. Additionally or alternatively, the LTF tones may be sent on selected tones for each AP. The sharing AP 301a may transmit (e.g., multicast or broadcast) a beamforming report (BFRP) trigger frame (BFRP TF) for feedback. After SIFS, STAs 1, 2, 3 may response feedback with compressed BFRP/CQIs 345, 350, 355.

When a STA receives an NDP, it may measure the channel and prepare the CSI feedback report. Three different embodiments may be used to collect the CSI from the STAs: (1) each AP collects all CSI which includes the feedback of the in-BSS and OBSS stations; (2) each AP collects CSI from its associated STAs only; and (3) the Sharing AP collects the CSI for all the shared APs in the coordination group.

In general, the channel sounding in Multi-AP may need to consider: (1) STAs involved in the sounding cannot hear the coordinating AP (or the master); (2) synchronization of APs in the Multi-AP coordinating se; (3) overhead, complexity and performance of different sounding schemes; (4) variants of NDP transmission in explicit and implicit sounding; and (5) feedback collection and reduction.

Embodiments for coordinated multi-AP set (MAPS) formation are described in this disclosure. In order to conduct coordinated multi-AP transmissions, such as coordinated OFDMA, coordinated spatial reuse, joint transmission, coordinated beamforming, and shared TXOP for TDMA and/or OFDMA, etc., it is beneficial to establish a candidate multi-AP sets. An efficient protocol to establish a multi-AP set and convey parameters to be used during any future multi-AP transmissions are needed.

Embodiments for coordinated multi-ap sounding are described in this disclosure. In many transmission scenarios that can be provided by coordinated multi-AP transmissions, such as coordinated OFDMA, coordinated SR, coordinated beamforming and coordinated joint transmissions, it is important to be able to conduct sounding from multiple APs concurrently. The coordinated transmission schemes may not function without a multi-AP sounding procedure. An effective and efficient multi-AP sounding protocol with limited overhead are needed.

Figure 4:
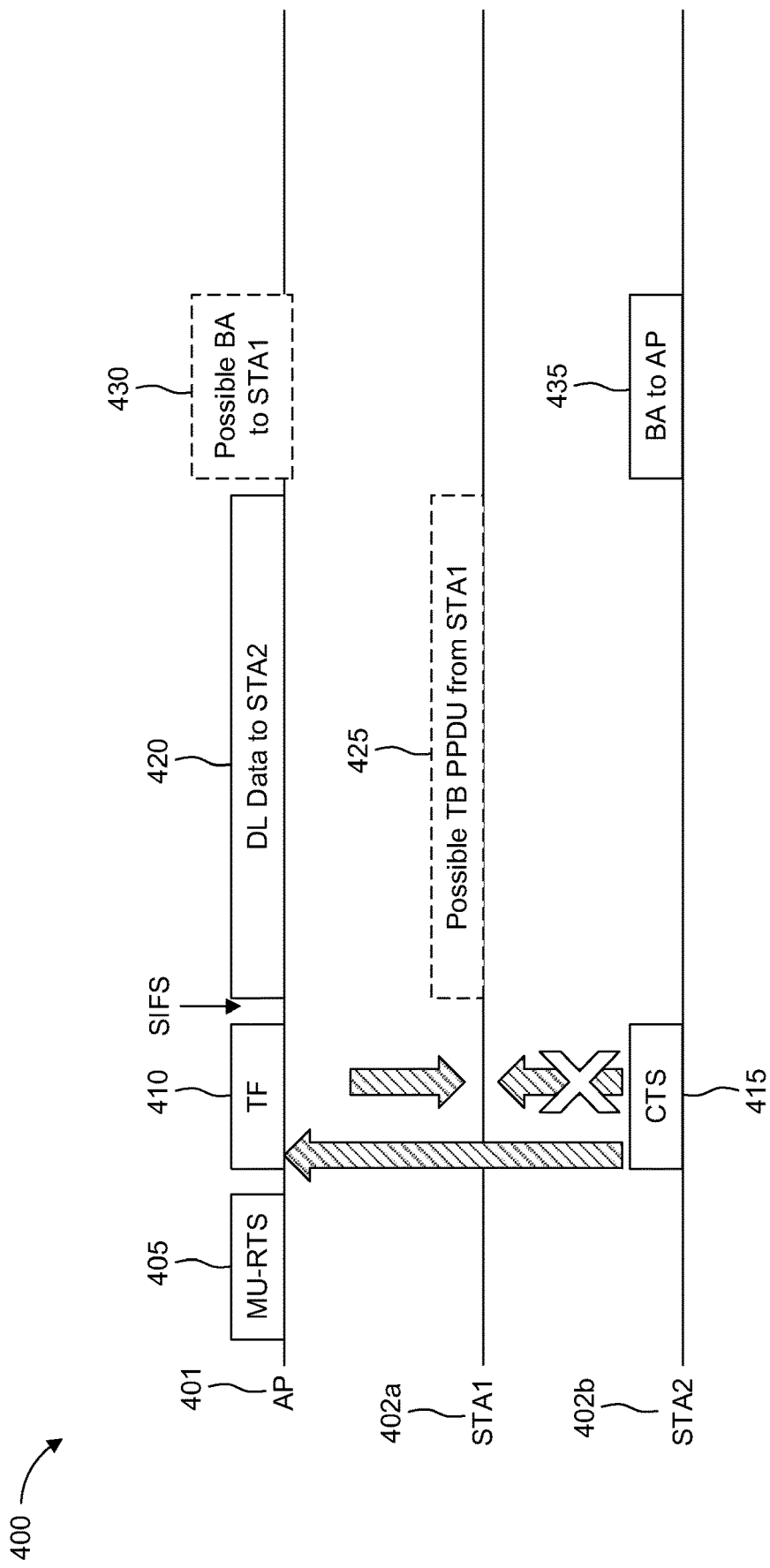
FIG. 4 is a diagram illustrating an example full duplex transmission opportunity (FD TXOP) via a collision test in a single Basic Service Set (BSS)

Embodiments for multi-AP set (MAPS) as a full-duplex AP are described in this disclosure. FIG. 4 illustrates an example full duplex transmission opportunity (FD TXOP) via a collision test 400 in a single Basic Service Set (BSS), which may be used in combination with any of other embodiments described herein. For full-duplex TXOP for a BSS, an AP (e.g., AP 401) is full-duplex on a channel while STA (e.g., STAs 1, 2 402a, 402b) is half-duplex on the same channel. The full-duplex AP can take advantage of its capability to initiate a full-duplex TXOP to allow different STAs to perform transmission and reception at the same time. As illustrated in FIG. 4, an AP 401 may transmit MU-RTS 405 to STA 1 402a and STA 2 402b and receive a CTS 415 from the STA 2 402b. After transmitting the trigger frame (TF) 410 to STA 1 402a, the AP 401 may transmit DL data 420 to STA 2 402b while receive the TB PPDU 425 from STA 1 402a during the FD TXOP. The AP 401 may then transmit block acknowledgement (BA) 430 to STA 1 402a. The STA 2 402b may transmit a BA 435 to the AP 401.

In WLAN, normally the radios on APs are not full duplex. However, in a multi-AP set (MAPS) deployment, two or more APs in the set can perform the roles of transmitter and receiver separately and the multi-AP set (MAPS) may behave equivalently as a single full-duplex AP, as long as the transmitting AP does not interfere with the receiving AP. Additional procedures may be needed to make this embodiment applicable to a multi-AP set.

Embodiments for multiple (e.g., 2) NAV update during the multi-AP set sounding/TXOP are described in this disclosure. For example, in 11 ax, 2 NAVs, intra-BSS NAV and basic NAV may be used for non-AP STAs. Currently when a STA responding to a trigger frame (TF, which may be a beamforming report poll/BFRP) with CS required set to 1, it cannot transmit TB-PPDU if the basic NAV indicates busy.

In 802.11be, a STA may perform measurement on OBSS AP's NDP and responding to an OBSS AP's BFRP. In this case the basic NAV may be set by the OBSS sounding AP, and the STA following the 11 ax rule may not be able to respond to OBSS AP's BFRP.

Embodiments for coordinated multi-AP transmission procedure are described in this disclosure. There are multiple coordinated multi-AP transmission schemes, such as coordinated spatial reuse (C-SR), coordinated OFDMA (C-OFDMA), coordinated TDMA (C-TDMA), etc. A combination of these schemes may provide more flexible and efficient procedures for the system and using the sounding results to schedule a more efficient C-MAP transmission may be needed.

Embodiments for Buffered traffic reporting (BSR) are described in this disclosure. The BSR in 802.11ax supports the granularity of access category (AC). In each AC there could be multiple TIDs. In 802.11be, the TIDs may be mapped to different links (e.g., bands). It is desirable that the scheduler (for MAP or single BSS) on a particular link has the information of traffic that can be transported on the link.

For example, an AP 2 may participate in a shared TXOP on link x. Based on BSR from STA 2, AP 2 may know that the AP 2 has UL traffic for Access Category y (ACy). However, TIDz corresponding to ACy for STA 2 may not be mapped to link x. The AP 2 may need more information of buffered traffic which can be sent on the link before it can decide whether to join a shared TXOP or share a TXOP.

Furthermore, the BSR A-control may be the maximum size of HE-control and difficult to make extensions. That means, creating a new A-control with the same size may not convey more information.

Embodiments for channel sounding with wired backhaul are described in this disclosure. In all coordinated multi-AP transmission schemes, there is a need to exchange information between APs, such as request/response when forming a multi-AP transmission set, RSSI or CSI within BSSs and between OBSSs, acknowledgement at the end of the multi-AP set up and data transmission, etc. All of these information exchanges may be considered as overhead, if the same resources/channel/band are used for data transmission, which may lead to low system throughput and complication when the process of information exchanges is interrupted by other inference/collision sources. In many deployment scenarios (e.g., enterprise offices/buildings), APs are already connected via cable/wire in the ceiling/wall. Those connections typically have wider bandwidth and more reliable. So, many high overhead processes, such as multi-AP sounding, can rely on such connections. Specific steps for multi-AP channel sounding when the wired backhaul link is available need to be defined.

Embodiments for coordinated multi-AP set management procedure are described herein.

First, embodiments for multi-AP set (MAPS) establishment are described herein.

A multi-AP set (MAPS) may comprise one or more coordinating AP and one or more coordinated AP. A coordinating AP may also be called a sharing AP, primary AP or master AP. The coordinating AP or sharing AP may be the AP that obtained a TXOP and decides to share with a number of other APs in its vicinity. In another example, a coordinating AP may be assigned beforehand by upper layers or by configuration in a given area or for a set of APs or for a multi-AP Set (MAPS). These terms coordinating AP, sharing AP or master AP may be used interchangeably throughout this disclosure. A coordinated AP may also be named as a shared AP, member AP, participating AP, secondary AP or slave AP. The coordinated APs may be APs that want to share a TXOP that a coordinating AP or sharing AP obtained and is willing to share. Each of the coordinated AP may be assigned a coordinating AP by upper layers or by configuration. The terms coordinated AP, shared AP, member AP, participating AP, or slave AP may be used interchangeably throughout this disclosure.

A multi-AP set (MAPS) may be dynamic or static. In a static MAPS, the number of APs may be fixed. A coordinating AP may be assigned to the static MAPS. However, the number or the subset of APs participating in each of the MAP transmissions may not the same. In a dynamic MAPS, the number of APs and/or which APs may be part of the dynamic MAPS may change from time to time or depend on the TXOP in which the MAPS transmits.

In another example, the set of MAPS may be different depending on the type of multi-AP transmissions that are being conducted.

Second, embodiments for Multi-AP set element and information are described herein.

Figure 5:
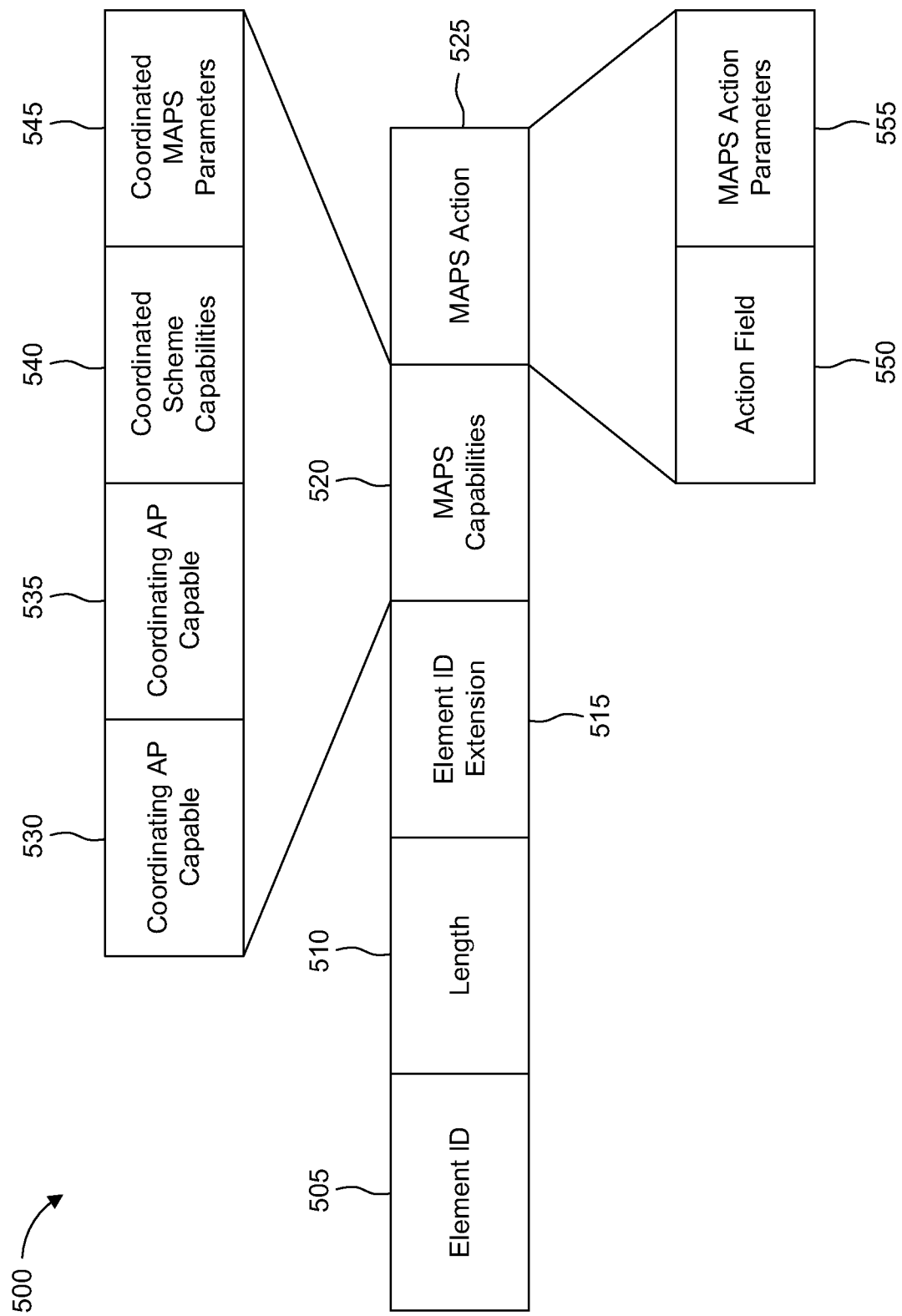
FIG. 5 is a diagram illustrating an example design of the multi-AP set (MAPS) element.

FIG. 5 illustrates an example design of the multi-AP set (MAPS) element 500, which may be used in combination with any of other embodiments described herein. An AP may include a MAPS element 500 in its beacons, short beacons, FILS Discovery frames, probe request or probe response frames, association request or association response frames, public action frames, MAPS capabilities frames, or another type of frames that it transmits.

The MAPS element 500 may include, but are not limited to, one or more of the following fields and information: element ID 505 and element ID extension 515, length 510, MAPS capabilities 520, and MAPS action field 525.

The element ID 505 and element ID extension 515 together may indicate that the current element is a MAPS element 500.

The length field 510 may indicate the length of the MAPS element.

The MAPS capabilities field 520 may indicate the capabilities for coordinated MAP transmissions for the transmitting STA. The MAPS capabilities field 520 may include, but are not limited to, one or more of the following subfields or information: coordinating AP capable 530, coordinated AP capable 535, coordinated scheme capabilities 540 and coordinated MAPS parameters 545.

The coordinating AP capable subfield 530 may indicate whether the transmitting STA is capable of being a coordinating AP in a MAPS.

The coordinated AP capable subfield 535 may indicate whether the transmitting STA is capable of being a coordinated AP in a MAPS.

The coordinated scheme capabilities subfield 540 may indicate one or more coordinated transmission schemes that the transmitting STA is capable of, such as coordinated OFDMA, coordinated TDMA, coordinated SR, shared TXOP TDMA, shared TXOP OFDMA, joint transmission, coordinated beamforming. The coordinated scheme capabilities 540 may be implemented as a bitmap wherein each bit corresponding to a coordinated scheme mentioned above. In one example, a MAPS ID may be included to identify the coordinated scheme capabilities for the specific MAPS ID. In another example, there are multiple coordinated scheme capabilities subfields 540 and coordinated MAPS parameters subfields 545, with each is associated with a MAPS ID. The MAPS ID may be implemented as the MAC address of the coordinating AP. For example, the group bit in the MAC address of the coordinating AP may be set to 1 to indicate that it is a MAPS ID. The MAPS ID may also be a BSS color identifying a MAPS. Or the MAPS ID may be any other type of IDs agreed.

The coordinated MAPS parameters field 545 may indicate the parameters associated with the MAPS advertised. The parameters may include, but are not limited to, MAPS ID, BSS color for the MAPS being advertised, bandwidth, number of links, and preferred channel/RU. In addition, this parameter subfield may include one or more APs which may be the coordinated APs in the MAPS. In addition, there may be an indicator which AP is the coordinating AP.

The MAPS action field 525 may indicate the requested action related to the MAPS indicated. The MAPS action field may include an action field 550 and a MAPS action parameters field 555. One or more MAPS action field 525 may be included in the MAPS element 500 to indicate one or more actions desired. One or more of the following subfields or information may be included: an action field 550, a request to establish a MAPS, a request to join a MAPS, a request to leave a MAPS, disband MAPS, and a response.

The action field 550 may indicate the details of the requested action. The action field 550 may include a token field to indicate the request and response sequence. Some requested actions may be: a request to establish a MAPS, a request to join a MAPS, a request to leave a MAPS, disband MAPS, and a response.

The request to establish a MAPS may be used to request that another STA becoming a coordinating AP to establish a new MAPS.

The request to join a MAPS may be used to request a STA to join the MAPS as a coordinated AP. The MAPS ID may be indicated as well.

The request to leave a MAPS may be used by a coordinated AP to request to leave a MAPS. This request may be sent by a coordinated AP to a coordinating AP of the MAPS. The MAPS ID may be indicated as well. This request may also be used by a coordinating AP to announce that a MAPS for which it is a coordinating AP will be disbanded. Receiving STAs may remove the entry of such MAPS from this memory.

The disband MAPS action may be used to disband an established MAPS. This action may be sent by the coordinating AP, or another STA, of the MAPS to announce that the MAPS that is headed by the transmitting AP will be disbanded. The MAPS ID may be indicated as well. Receiving STAs that are part of the MAPS may remove the entry of such MAPS from this memory.

The response action may be used by a STA to respond to requested action that have received from other STAs. Response action may include: accept, reject, confirm, etc. In another example, the response may be transmitting a frame, such as an action frame, that conduct the requested action, such as establish a new MAPS, request to join a MAPS, announcement of disbanding current MAPS, etc.

The MAPS action parameters subfield 555 may indicate the parameters of the requested action, which may include, but are not limited to: MAPS ID, preferred channel/RU, preferred MAPS operations, MAPS transmission parameters, or the like.

The MAPS ID subfield may indicate the ID of the MAPS identified.

The preferred channel/RU subfield may indicate the preferred channel or RU that the requesting STA is requesting/assigning for future schedule assignments as a part of the MAPS coordinated or joint transmissions/receptions, depending on the action detailed in the MAPS action.

The preferred MAPS operations field may include one or more MAPS operation modes, such as coordinated OFDMA, coordinated TDMA, shared TXOP OFDMA/TDMA, joint transmission, coordinated beamforming, coordinated spatial reuse, etc. This subfield may include a bitmap with each bit associated with a particular MAPS operations. The MAPS operation modes may be requested or indicated depending on the action detailed in the MAPS action field.

The MAPS transmission parameters subfield may indicate maximal TXOP sharing duration, bandwidth, number of links, or the like.

It is worth noting that all or any of the information or the subset of this may be included in any existing elements, or new elements, or any parts of any existing or new frames, or MAC or PLCP headers, or SIG or SIG-A, SIG-B, or U-SIG fields.

Third, embodiments for multi-AP set setup procedure are described herein.

The multi-AP set (MAPS) setup procedure may include, but are not limited to, one or more of the following steps:

Each STA or AP that is capable of conducting MAPS transmissions may include a MAPS capabilities element in its beacon, short beacons, probe request or probe response frames, association request or association response frames, FILS Discovery frames, other type of management, control or data frames or action frame or public action frames. The STA or AP may indicate which MAPS operations it is capable of.

In one example, each STA or AP may advertise one or more MAPS of which it is a part of including the MAPS operating parameters, including MAPS ID, MAPS BSS color. In one example, an AP may only advertise the MAPS of which it is the coordinating AP. An AP which is a part of a MAPS may indicate all member APs of the MAPS, indicating which APs are the coordinated AP and which AP is the coordinating AP, or which APs are the sharing APs in a shared TXOP OFDMA/TDMA MAPS.

An AP or a coordinating AP or sharing AP may request one or more APs to join the MAPS by sending a MAPS setup request frame. This may be after the transmitting AP discovers that receiving AP is capable of MAPS operation, for example, by receiving a frame from the AP containing a MAPS element advertising its MAPS capabilities. The MAPS setup request frame may include a MAPS element in which the MAPS action field contains request to join. The same MAPS element or frame may also include the MAPS ID as well as other MAPS operating parameters. The request to join action may also include whether the receiving AP is requested to become a coordinating or coordinated AP or a sharing AP or shared AP.

When an AP or STA receives a MAPS setup request frame, it may respond with a MAPS setup response frame, or any other frames that may contain a MAPS element which includes a MAPS action field that includes a MAPS response. The MAPS response action may include acceptance of the invitation to join the MAPS, or rejection of the invitation. The AP may indicate its MAPS operating mode in the MAPS, and whether the AP will become a sharing AP or coordinating AP or a coordinated AP. In another example, when an AP or STA receives a MAPS setup request frame, it may respond by sending a MAPS setup request frame, and include request to join action in the MAPS element to request to join the MAPS of which the AP is a coordinating or sharing AP. The AP may indicate its MAPS operating mode in the MAPS, and whether the AP will become a sharing AP or coordinating AP or a coordinated AP.

Another example, an AP may request to join a MAPS after receiving a frame including advertisement of one or more MAPSs, which may be transmitted by a member AP or coordinating or sharing AP of a MAPS. The AP may transmit a MAPS setup request frame or any other frames that includes a MAPS element, in the MAPS action field of which a request to join is indicated. The requesting AP may indicate whether it wants to function as a coordinating AP or sharing AP or just as a coordinated AP. Once an AP receives a MAPS setup request frame or a frame including a request to join action, the AP may respond with a MAPS setup response frame or another frame including a MAPS element which may include a response action such as accept, reject, etc. The MAPS setup response frame may include one or more MAPS operating parameters, such as MAPS ID, MAPS BSS color, MAPS operation modes, whether the receiving AP is expected to be a coordinating AP, sharing AP, sharing AP of a TXOP, or just coordinated AP or shared AP. It may also indicate the operating links, operating bandwidth, channels, or likely assigned channels, links, or RUs during any coordinated MAPS transmissions or sharing or shared TXOP.

An AP which joined a MAPS may announce its membership of the MAPS in the MAPS element or any other element or frames which may be included in the beacon, short beacon, probe request frame, probe response frame, association request frame, association response frames, FILS discovery frames, MAPS frames, action or public action frames, or the like. The MAPS element may include information of MAPS operating parameters, such a MAPS ID, MAPS BSS Color, MAPS operation modes, whether the AP is a coordinating AP, sharing AP, sharing AP of a TXOP, or just coordinated AP or shared AP. It may also indicate the operating links, operating bandwidth, channels, or likely assigned channels, links, or RUs during any coordinated MAPS transmissions or sharing or shared TXOP. It may also indicate to its associated STAs or non-AP MLDs that they are expected to switch to a different channels or RUs during any coordinated MAPS transmissions or sharing or shared TXOP. It may also indicate to its associated STAs that they need to monitor transmissions identified by one or more MAPS BSS color(s), and these STAs may consider transmissions including one or more MAPS BSS colors indicated in the MAPS element as an intra-BSS PPDU, and/or a PPDU that the STAs need to decode. In addition, one or more member APs or coordinating or sharing AP ID addresses (such as MAC addresses, or MLD IDs) may also be indicated by an AP in the MAPS element, and/or one or more MAPS IDs, which may be included in any frames transmitted such as CAP TXOP Indication (CTI) frame, CAP TXOP Request (CTR) frame, CAP TXOP AP Schedule (CTAS) frame, CAP TXOP Local Schedule (CTLS) frame, or other type of frames such as trigger frames, NDP announcement (NDPA) frame), or other type of frames. The associated STAs or non-AP MLD need to monitor transmissions identified by one or more MAPS IDs or member AP IDs or sharing AP ID, and these STAs may consider transmissions including one or more MAPS IDs or member AP IDs indicated in the MAPS element as an intra-BSS PPDU, and/or a PPDU that the STAs need to decode.

In one example, an AP may request a certain range of MAPS AIDs (or an ID representing the MAPS) for its associated STAs when joining a MAPS. The MAPS AID (or MAPS ID) range for a member AP may be assigned by the coordinating AP or sharing AP. The MAPS AID (or MAPS ID) range may be headed by one or more bits that identify APs. Once the range of MAPS AID (or MAPS ID) is assigned to a member AP, the AP may then announce the MAPS AIDs (or MAPS IDs) for its associated STAs. A MAPS AID (or MAPS ID) for an associated STA may be the AID (or ID) already assigned to the associated STA in addition to one or more bits that will identify the member AP to which it is associated. The STA associated with a member AP of a MAPS may respond to a trigger frame that includes the MAPS ID and/or the MAPS AID assigned to it. The STA associated with a member AP of a MAPS may respond to a frame that includes the MAPS ID and/or the MAPS AID assigned to it.

A member AP, coordinated AP, coordinating AP or sharing AP that is already a member of a MAPS may send a MAPS setup request frame or any frames including a MAPS element which includes a request to leave action in the MAPS action field to request to leave the MAPS. The MAPS setup request frame may be sent to a coordinating AP or a sharing AP of the MAPS. Once a MAPS setup request frame or any other frames are received including a MAPS element indicating that an AP requests to leave a MAPS, an AP may respond with a MAPS setup response frame including a MAPS action such as accept or reject. If a member AP has left a MAPS, it may remove information related to the MAPS from its MAPS element, or stop transmitting the MAPS element in frames it transmit. It may also send out any management, control, action or public action frames announcing that it is no longer associated with one or more MAPS. Any associated STA receiving the frame may remove all stored information associated with the identified MAPS from its memory.

In one example, one AP may send a MAPS setup request frame to another AP or STA to request that AP to establish a MAPS. The receiving AP or STA may respond with a MAPS setup response frame, or simply start advertising a new MAPS.

Fourth, embodiments for multi-AP set disband procedures are described herein.

The MAPS disband procedure as an example may be as follows:

A coordinating AP or sharing AP or a member AP may send out a MAPS setup request frame or any other frame including a MAPS element indicating disband MAPS in the MAPS action frame to announce that the AP is disbanding the MAPS.

The MAPS setup request frame or any other frame may also include a time to terminate to indicate the time at which the MAPS is expected to be disbanded.

At the time indicated in the MAPS setup request frame or other frames, or at the time of receiving the MAPS setup request frame or any other frames including a MAPS element indicating disband MAPS in the MAPS action frame, all member APs or STAs may remove the entries of the MAPS from their memory, including MAPS BSS color(s), etc. In addition, all member APs of the MAPS may transmit MAPS termination notice to all its associated STAs. The frame may identify one or more MAPS that are being terminated. All associated STAs that have received the frame may remove all information related to the identified MAPS from its memory.

Embodiments for coordinated multi-AP sounding procedures are described herein.

First, embodiments for coordinated multi-AP sounding procedures using shared TXOP are described herein.

If one of the MAPS operating mode is a shared TXOP, or shared TXOP OFDMA, or shared TXOP TDMA, the coordinated multi-AP sounding procedure for such a MAPS may be as follows:

The member APs of the MAPS may have advertised that they are capable of shared TXOP operations, which may be the shared TXOP OFDMA, shared TXOP TDMA, or other type of shared TXOP operations, or shared TXOP sounding. In another example, the MAPS may not be established beforehand.

The member APs of the MAPS may have indicated to their associated STAs or multi-link devices (MLDs) that they may conduct shared TXOP operations or shared TXOP sounding procedure.

A coordinating AP or sharing AP may start the multi-AP sounding procedure by sending a CTI frame after obtaining a TXOP. The CTI frame may indicate the purpose of the shared TXOP. The purpose of the shared TXOP may include, but is not limited to: conducting multi-AP sounding, conducting data transmission, conducting low latency/higher priority traffic data transmission, conducting MAPS coordination function, conducting multi-AP sounding feedback, and combined multi-AP sounding and feedback.

The CTI frame may indicate one or more member APs that are being requested to participate in the shared TXOP.

One or more member APs of the MAPS, or an AP that is willing to participate in the multi-AP sounding or transmission, may respond with a CTR frame after receiving the CTI frames indicating that it wants to participate in the shared TXOP. A member AP may also send request frames to one or more APs in the MAPS before receiving a CTI frames to request a certain type of shared TXOP operations, such as shared TXOP data transmission, shared TXOP low latency data transmission, or shared TXOP multi-AP sounding, or shared TXOP feedback.

After receiving the CTRs from one or more member APs, the coordinating AP or sharing AP may transmit a CTAS with a schedule for the member APs to transmit sounding frames such as NDP frames. In one example, all member APs are scheduled to transmit sounding frames or NDP frames concurrently over the entire bandwidth, and/or over all links. In an example, the CTAS may include orthogonal sequences assigned to each member APs to be used during the upcoming sounding procedures. In another example, each of the member APs are assigned to separate channel/RU/link. In yet another example, each of the member APs are assigned to a separate time interval and/or channel/RU/link, and/or orthogonal sequences. In another example, a number of the member APs may be allocated on the same resources. The CTAS frame may also include the type of desired feedback for the upcoming sounding.

In another example, the coordinating AP or sharing AP may transmit a NDPA instead of a CTAS. The NPDA frame may include an indication that it is for multi-AP sounding. The NDPA may include a schedule for the member APs to transmit sounding frames such as NDP frames. In one example, all member APs are scheduled to transmit sounding frames or NDP frames concurrently over the entire bandwidth, and/or over all links. In one example, the CTAS or NDPA may include orthogonal sequences assigned to each member APs to be used during the upcoming sounding procedures. In another example, each of the member APs are assigned to separate channel/RU/link. In yet another example, each of the member APs are assigned to a separate time interval and/or channel/RU/link, and/or orthogonal sequences. In another example, a number of the member APs may be allocated on the same resources. The CTAS or NDPA frame may also include the type of desired feedback for the upcoming sounding.

After receiving the CTAS or NDPA frame, a member AP or an AP that has indicated its willingness to participate in the shared TXOP (i.e., participating AP) and has been assigned a schedule in the received frame may transmit a CAP TXOP Local Schedule (CTLS) or NDPA frames. The CTLS or NDPA frame may include the indication that the upcoming TXOP will be used for multi-AP sounding. The CTLS or NDPA frame may include the sounding transmission schedule for one or more member APs that are participating in the multi-AP sounding. The CTLS or NDPA may also include the type of desired feedback. The CTLS or NDPA may also include a listening schedule for the associated STAs. The listening schedule for the associated STAs may include the time, channel/RU/link, and a number of APs that one or more associated STAs may conduct listening. The one or more associated STAs may be identified explicitly in the CTLS or NDPA. The term CTLS and CAP TXOP Local Announcement (CTLA) may be interchangeably used throughout this disclosure.

At the time following the CTAS or NDPA frame, for example, an SIFS time after the CTLS or NDPA ended, the member APs may follow the sounding schedule to transmit its sounding frames or NDP frames during the time, on the channel/RU and/or links.

The associated STAs to member APs may receive the sounding frames based on the multi-AP sounding schedule or multi-AP listening schedule assigned to them by their APs. They may calculate the feedback based on the indicated desired feedback type.

In another MAPS transmission or shared TXOP or within the same shared TXOP, a coordinating AP or sharing AP, which may be in the same group of MAPS, may indicate the shared TXOP is meant for conducting multi-AP feedback in a transmitted multi-AP feedback poll frame or a CTI. Feedback collection or combined multi-AP sounding and feedback may also take place during a shared TXOP data transmission session. The multi-AP feedback poll frame or CTI may be addressed to one or more APs, which may be member APs in the same MAPS.

Members APs of the same MAPS, or an AP that is willing to participate in the feedback collection, may respond with a CTR, or another frame after receiving multi-AP feedback poll or a CTI. The CTR indicates that they are willing to participate in the shared TXOP feedback collection. The APs may indicate their preferred channel, time interval, RU they would like to use for collecting sounding feedback.

The coordinating or sharing AP may respond to the CTR with a CTAS, which may include a polling schedule for each of the APs and their BSS. The polling schedule may indicate a schedule, channel, RU, and/or link on which an AP can send out multi-AP sounding feedback poll frames to one or more associated STAs in one or more of the BSS' associated with one or more the member AP that participates in the multi-AP sounding feedback. In an example, a CTR may include responding schedule for one or more AP's BSS to provide their feedback for the multi-AP sounding, including a ranges of time, channel, slots, RU, link, or the like.

After receiving the CTAS from the coordinating AP, a member AP or scheduled AP in the CTAS may indicate to their associated STAs in a CTLS frame or multi-STA sounding feedback poll a polling schedule for one or more associated STAs. The polling schedule may include which AP may conduct feedback polling and the resources used such as RU, channel, time interval, link, or the like. In an example, the CTLS frame may include a responding schedule for one or more associated STAs. The responding schedule may include resources on which one or more associated STAs may send their feedback for the multi-AP sounding, including time, channel, slots, RU, link, or the like. In another example, the responding schedule may include resources on which one or more associated STAs may monitor for trigger frames to solicit their feedback for the multi-AP sounding, including time, channel, slots, RU, link, or the like. The responding schedule may include an indication of triggered based access. The polling schedule or responding schedule may be based on the assignment received from the sharing AP or coordinating AP.

The coordinated AP, member AP or shared AP receiving a polling schedule from the coordinating or sharing AP may utilize the resources indicated to send a multi-AP sounding feedback poll frame to solicit sounding feedback from one or more associated STAs from one or more of the coordinated or shared AP.

The STAs or MLDs receiving a responding schedule may use the resources indicated to send a sounding feedback. Additionally, or alternatively, the STAs or MLDs receiving a responding schedule may switch to the resources indicated to monitor for multi-AP sounding feedback poll to provide feedback requested.

It is worth noting that the specific types of frames described are only examples, and the frames may be any type of management, control, action, data, public action or other type of frames.

Figure 6:
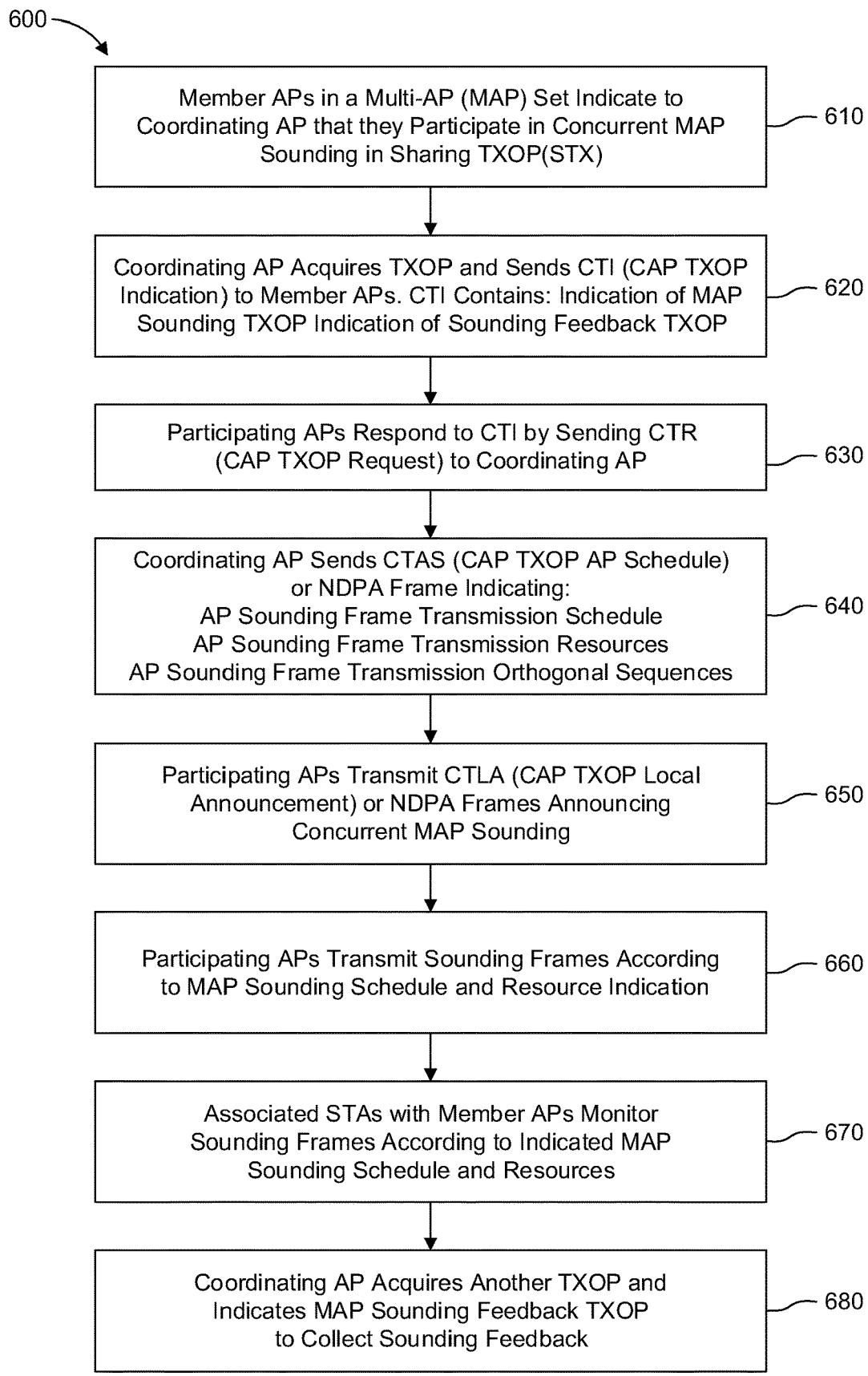
FIG. 6 is a diagram illustrating an example coordinated MAP sounding procedure.

FIG. 6 illustrates an example multi-AP sounding procedure 600, which may be used in combination with any of other embodiments described herein. At step 610, one or more member APs in a multi-AP set (MAPS) may indicate to a coordinating AP (CAP) that the one or more member APs participate in concurrent or coordinated multi-AP sounding in a shared TXOP. In an example, one or more member APs in the MAPS may transmit or may have transmitted one or more indications indicating that the one or more member APs are capable of the multi-AP sounding during the shared TXOP. The one or more indications may be included in a management frame, control frame, action frame, data frame, public action frame, or any other type of frames. At step 620, the coordinating AP may acquire a TXOP (or shared TXOP) and send or broadcast a CAP TXOP indication (CTI) to one or more member APs. The part of TXOP or the entire TXOP (or shared TXOP) may be shared with one or more APs and/or the coordinating AP. The CTI may indicate the purpose of the shared TXOP. The purpose of the shared TXOP may include, but are not limited to, multi-AP sounding, multi-AP sounding feedback, and data transmission or combined multi-AP sounding and multi-AP sounding feedback. The coordinating AP may obtain the TXOP (or shared TXOP), for example, through EDCA or other channel access methods. The CTI may be a management frame, control frame, action frame, data frame, public action frame, or any other type of frames. In an example, the CTI may include one or more indications such as an indication of multi-AP sounding TXOP, an indication of sounding feedback TXOP, or the like.

At step 630, the one or more member APs may transmit a CAP TXOP request (CTR) to the coordinating AP in response to the CTI. The CTRs may indicate that the one or more member APs, for example, the transmitting AP, are willing to perform the activity indicated by the CTI during the shared TXOP. For example, the CTR may indicate that the one or more member APs of the MAPS are willing to perform multi-AP sounding or multi-AP sounding feedback during the shared TXOP. The one or more member APs may be interchangeably referred to as participating AP(s). The participating AP(s) may be a subset of MAPs or all the member APs in the MAPS. For example, in a MAPS comprising four member APs, three of the member APs may transmit the CTRs to indicate that they are willing to participate the activity (e.g., sounding or feedback) in the shared TXOP. The CTR may be a management frame, control frame, action frame, data frame, public action frame, or any other type of frames.

At step 640, the coordinating AP may transmit or broadcast a CAP TXOP AP schedule (CTAS) or null data packet announcement (NDPA) to the one or more member APs. The CTAS or NDPA may indicate a transmission schedule and resource allocations to be performed by the one or more member APs during the shared TXOP. In an example, the CTAS may indicate a transmission schedule for one or more sounding frames to be transmitted by the one or more member APs during the shared TXOP. The CTAS or NDPA may also be transmitted to one or more STAs associated with the one or more member APs. In other words, the one or more STAs associated with the one or more member APs may overhear the transmission of the CTAS or NDPA so that they can be additionally covered for the activities (e.g., sounding or feedback) to be performed during the shared TXOP. The CTAS may be a management frame, control frame, action frame, data frame, public action frame, or any other type of frames. Alternatively, or additionally, the CTAS may be transmitted in a management frame, control frame, action frame, data frame, public action frame, or any other type of frames. The CTAS frame may include AP sounding frame transmission resources and/or AP sounding frame transmission orthogonal sequences.

The transmission schedule may indicate the one or more member APs' schedules (or the coordinating AP's schedule) or resource allocations for the activities performed by the one or more member APs (or the coordinating AP) during the shared TXOP. For example, the transmission schedule may indicate the one or more member APs' schedules (or the coordinating AP's schedule) for sounding performed by the one or more member APs (or the coordinating AP) during the shared TXOP. In an example, during the shared TXOP, AP 1 which is a coordinating AP may transmit a sounding frame according to the transmission schedule and APs 2-4 which are member APs in a MAPS may transmit sounding frames according to the transmission schedule. The transmission schedule and resource allocations for the multiple member APs (and the coordinating AP) may be the same or different depending on: (1) the geographic location of the member APs, STAs, or coordinating AP; and/or (2) the coordinated multi-AP transmission scheme such as coordinated spatial reuse, coordinated OFDMA, coordinated TDMA, coordinated beamforming/nulling, joint transmission. For example, some member APs may receive a part/subset of the transmission schedule based on their geographic location or transmission scheme and other member APs may receive a different part/subset of the transmission schedule based on their geographic location or transmission scheme. In another example, some member APs may receive the transmission schedule, but other member APs may not receive any transmission schedule depending on their geographic location and/or their transmission scheme.

The CTAS or NDPA may include at least one transmission resource indicating the transmission schedule of the activities to be performed by the one or more member APs (or the coordinating AP) during the shared TXOP. For example, the CTAS or NDPA includes a transmission resource for sounding frame transmission schedules by one or more member APs during the shared TXOP. Specifically, the one or more member APs may transmit sounding frames to one or more STAs associated with the one or more member APs according to the transmission schedule during the shared TXOP. The transmission resource may include, but are not limited to, time, frequency, channel, resource unit, time interval, links and orthogonal sequences. The coordinating AP may determine the transmission schedule based on the transmission resource. For example, the coordinating AP may determine the sounding frame transmission schedule base on the time information and/or the frequency information of the transmission resource. Alternatively or additionally, the coordinating AP may determine the sounding frame transmission schedule base on the orthogonal sequences included in the transmission resource. The orthogonal sequences may be a P matrix or a code that can identify different signals/frequencies/times for different users (e.g., member APs, STAs, or coordinating AP). The orthogonal sequence that can identify different signals/frequencies/times for different users (e.g., member APs, STAs, or coordinating AP) may be constructed by Kronecker product of a seed sequence and an orthogonal matrix or codes.

At step 650, the one or more member APs (or participating APs) may transmit CAP TXOP Local announcement (CTLA) or NDPA to one or more STAs associated with the one or more member APs. The CTLA may indicate to the one or more STAs that the shared TXOP is going to be used for the activities performed by the one or more member APs. For example, the CTLA may include sounding transmission schedules for the one or more member APs and/or listening schedules for the one or more STAs associated with the one or more member APs for the activities (e.g., sounding) performed during the shared TXOP. Based on the transmission schedule and/or listening schedule in the CTLA, the one or more STAs associated with the one or more member APs may understand in which channel, time, time period, frequency, order and/or orthogonal sequence the one or more STA receives transmissions (e.g., sounding frames) from the one or more member AP.

At step 660, the one or more member APs (or participating APs) may transmit frames (e.g., sounding frames) according to the transmission schedule during the shared TXOP. The one or more member APs may use the transmission resources indicated by the coordinating AP to transmit the frames (e.g., sounding frames). In an example where member APs 1-4 are in a MAPS, the channel is 80 MHz, and a shared TXOP is 4 ms, a coordinating AP may allocate the entire 80 MHz channel to the member AP 1 during the first 1 ms of the shared TXOP. The coordinating AP may allocate the entire 80 MHz channel to each member AP 2, 3, 4 during the second, third, and fourth 1 ms of the shared TXOP, respectively. Each member AP 1-4 may transmit sounding frames to its associated STA according to the transmission schedule as described above. In another example where member APs 1-4 are in a MAPS, the channel is 80 MHz, and a shared TXOP is 4 ms, a coordinating AP may allocate the entire 4 ms of the shared TXOP to the member AP 1 to transmit frames over the first 20 MHz. The coordinating AP may allocate the entire 4 ms of the shared TXOP to each member AP 2, 3, 4 to transmit frames over the second, third, and fourth 20 MHz, respectively. Each member AP 1-4 may transmit sounding frames to its associated STA according to the transmission schedule as described above.

At step 670, the one or more STAs associated with the one or more member APs may monitor frames (e.g., sounding frames) according to the indicated transmission schedule and/or the transmission resources (e.g., multi-AP sounding schedule and/or sounding frame transmission resources). The one or more STAs may receive the sounding frames from the one or more member APs and then calculate the feedback indicating the channel status. At step 680, the coordinating AP may acquire another TXOP for other actions or activities to be performed by one or more member APs during the TXOP. For example, once the coordinating AP acquires another shared TXOP, the coordinating AP may transmit, to the one or more member APs in the MAPS, another CTI frame indicating that multi-AP sounding feedback is to be performed during the another shared TXOP.

Figure 7A:
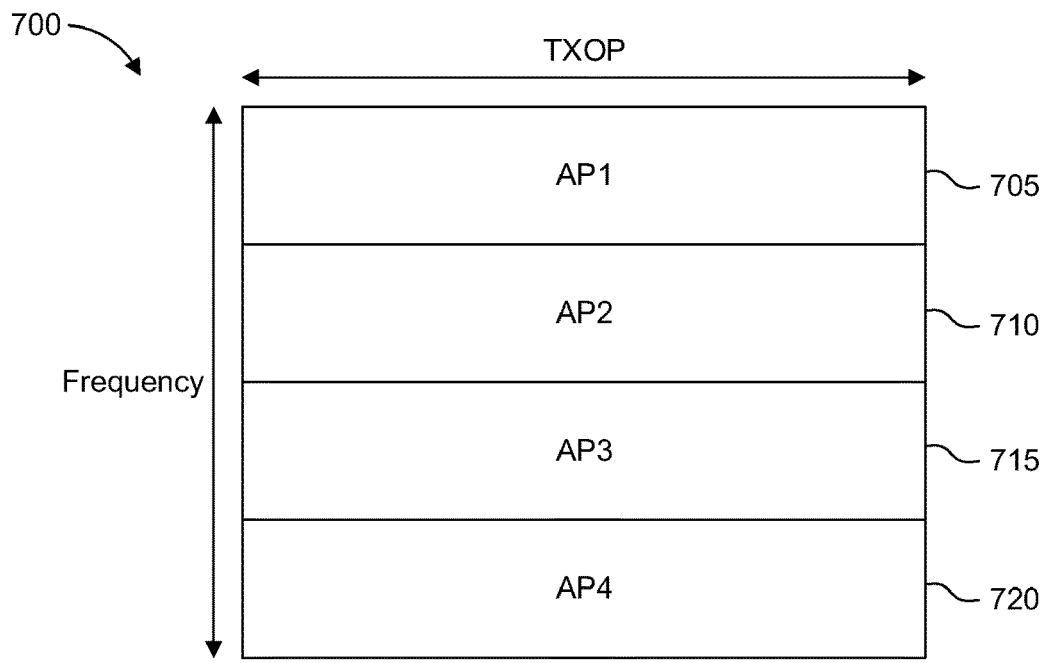
FIG. 7A is a diagram illustrating an example AP sounding frame transmission schedule with frequency resource division.

FIG. 7A illustrates an example AP sounding frame transmission schedule 701 with frequency resource division, which may be used in combination with any of other embodiments described herein. As illustrated in FIG. 7A, a coordinating AP may determine the transmission schedule by allocating the entire TXOP to APs 1-4 and by dividing the entire frequency to each AP 1-4 to transmit frames over the divided frequencies during the TXOP. For example, where APs 1-4 are member APs in a MAPS, the entire frequency is 80 MHz, and a shared TXOP is 4 ms, a coordinating AP may allocate the entire 4 ms of the TXOP to the AP 1 to transmit one or more frames over the first 20 MHz channel 705. The coordinating AP may allocate the entire 4 ms of the TXOP to the AP 2 to transmit one or more frames over the second 20 MHz channel 710. The coordinating AP may allocate the entire 4 ms of the TXOP to the AP 3 to transmit one or more frames over the third 20 MHz channel 715. The coordinating AP may allocate the entire 4 ms of the TXOP to the AP 4 to transmit one or more frames over the fourth 20 MHz channel 720.

Figure 7B:
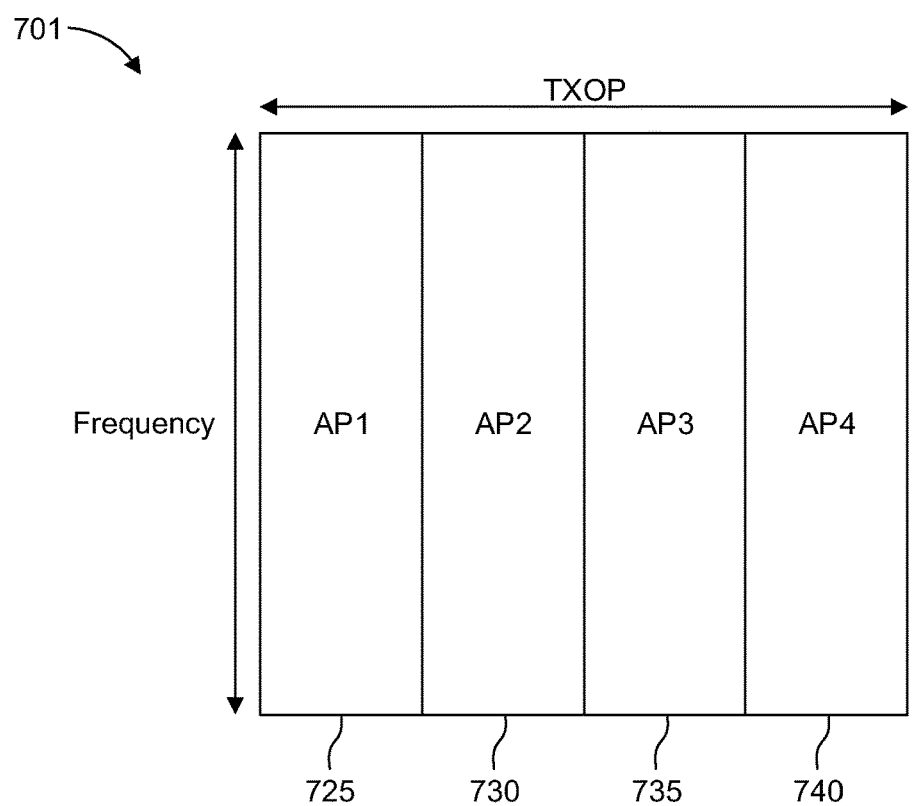
FIG. 7B is a diagram illustrating an example AP sounding frame transmission schedule with time resource division.

FIG. 7B illustrates an example AP sounding frame transmission schedule 702 with time resource division, which may be used in combination with any of other embodiments described herein. As illustrated in FIG. 7B, a coordinating AP may determine the transmission schedule by allocating the entire frequency to APs 1-4 and by dividing the TXOP to each AP 1-4 to transmit frames over the entire frequencies during the divided time period. For example, where APs 1-4 are member APs in a MAPS, the entire frequency is 80 MHz, and a shared TXOP is 4 ms, a coordinating AP may allocate the entire frequency of 80 MHz to the AP 1 to transmit one or more frames during the first time period (e.g., 1 ms) of the TXOP 725. The coordinating AP may allocate the entire frequency of 80 MHz to the AP 2 to transmit one or more frames during the second time period (e.g., 1 ms) of the TXOP 730. The coordinating AP may allocate the entire frequency of 80 MHz to the AP 3 to transmit one or more frames during the third time period (e.g., 1 ms) of the TXOP 735. The coordinating AP may allocate the entire frequency of 80 MHz to the AP 4 to transmit one or more frames during the fourth time period (e.g., 1 ms) of the TXOP 740.

Figure 7C:
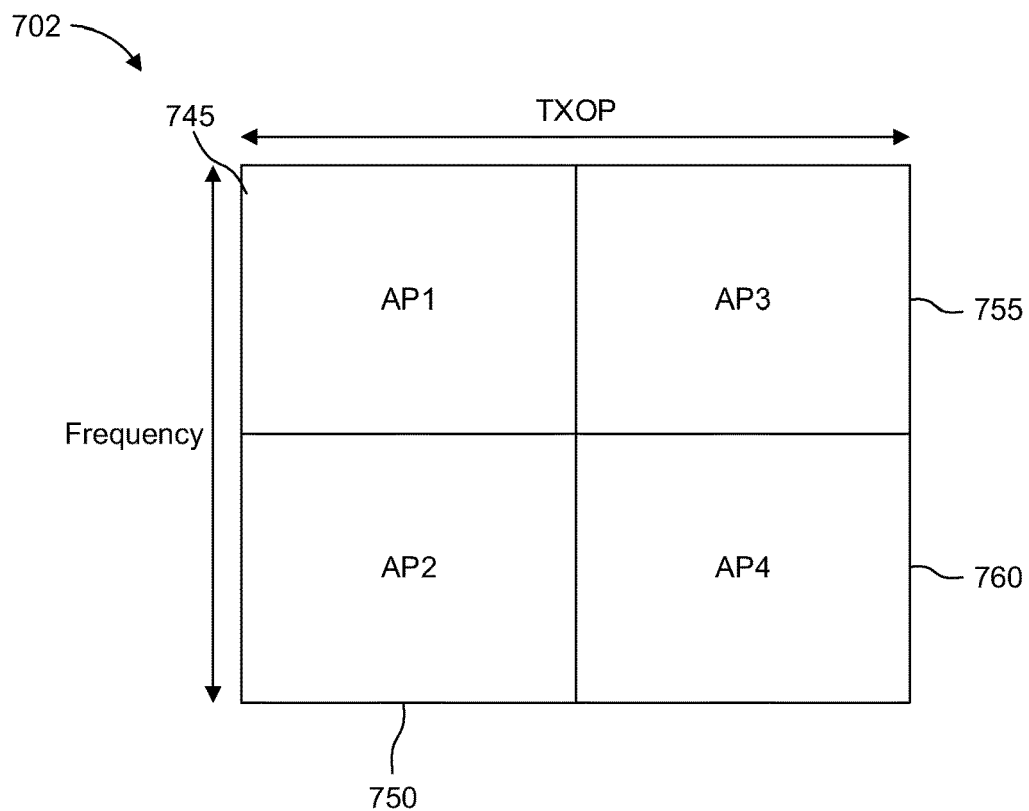
FIG. 7C is a diagram illustrating an example AP sounding frame transmission schedule with frequency and time resource division.

FIG. 7C illustrates an example AP sounding frame transmission schedule 703 with frequency and time resource division, which may be used in combination with any of other embodiments described herein. As illustrated in FIG. 7B, a coordinating AP may determine the transmission schedule by allocating the first half frequency to APs 1-2 and the second half frequency to APs 3-4, and by equally dividing the entire TXOP to APs 1-2 and APs 3-4 to transmit frames over the allocated frequencies during the divided time period. For example, where APs 1-4 are member APs in a MAPS, the entire frequency is 80 MHz, and a shared TXOP is 4 ms, a coordinating AP may allocate a 40 MHz channel to the AP 1 to transmit one or more frames during the first time period (e.g., 2 ms) of the TXOP 745. The coordinating AP may allocate another 40 MHz channel to the AP 2 to transmit one or more frames during the first time period (e.g., 2 ms) of the TXOP 750. The coordinating AP may allocate a 40 MHz channel to the AP 3 to transmit one or more frames during the second time period (e.g., 2 ms) of the TXOP 755. The coordinating AP may allocate another 40 MHz channel to the AP 4 to transmit one or more frames during the second time period (e.g., 2 ms) of the TXOP 760.

Figure 7D:
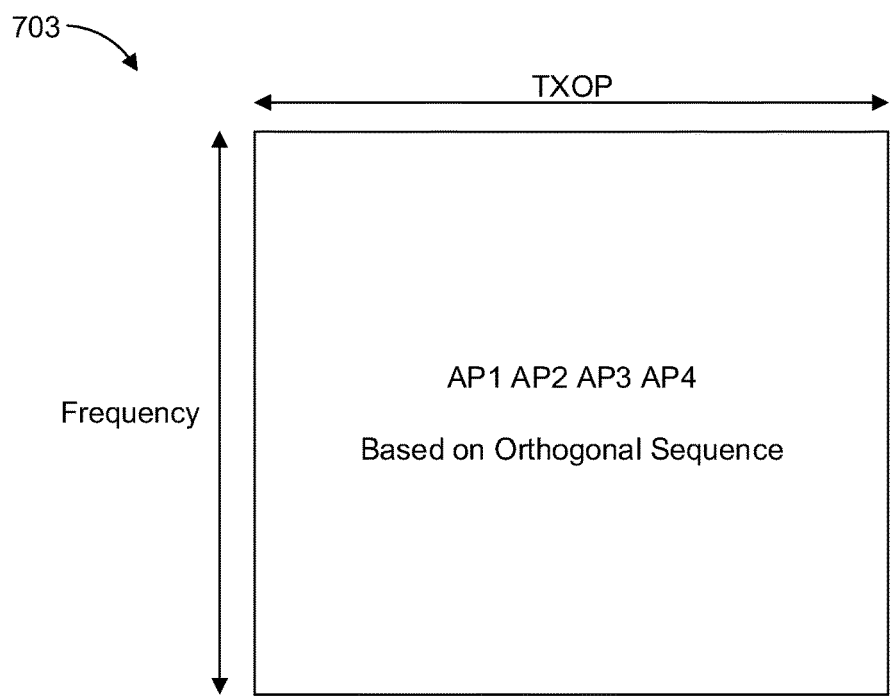
FIG. 7D is a diagram illustrating an example AP sounding frame transmission schedule with orthogonal sequence.

FIG. 7D illustrates an example AP sounding frame transmission schedule 704 with orthogonal sequence, which may be used in combination with any of other embodiments described herein. As illustrated in FIG. 7D, APs 1-4 may be allocated to the entire frequency and the entire TXOP, but APs 1-4 may transmit frames based on the orthogonal sequence. It is noted that the transmission schedules and/or the transmission resources herein are not limited to those illustrated in FIGS. 7A-D and may include other various transmission schedules and/or transmission resources depending on the multi-AP transmission scheme and/or geographic location of the coordinating AP, member APs and/or STAs.

Embodiments for coordinated multi-AP transmission procedures are described herein.

Figure 8:
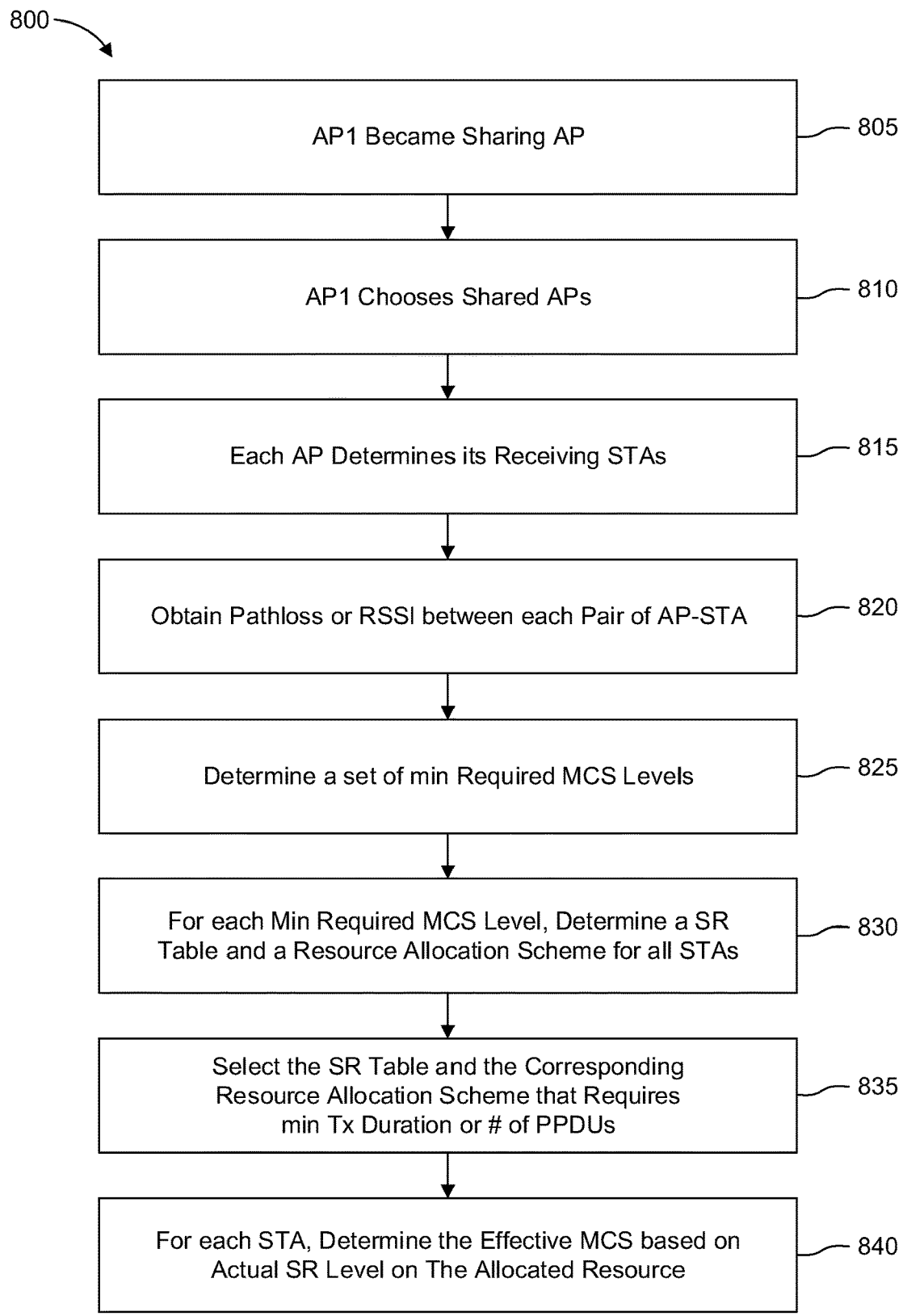
FIG. 8 is a diagram illustrating an example coordinated multi-AP transmission procedure.

FIG. 8 illustrates an example coordinated multi-AP transmission procedure 800, which may be used in combination with any of other embodiments described herein. As illustrated in FIG. 8, at step 805, an AP (e.g., AP 1) may become a sharing AP. At step 810, the sharing AP may choose one or more shared APs in a multi-AP set (MAPS). At step 815, each shared AP may determine its receiving STA. At step 820, the sharing AP may obtain pathloss or RSSI or SINR or other measurements between each pair of the shared AP/sharing and the STA and at step 825, determine a set of minimum required MCS levels. The step 825 may include feedback/report from STAs to its associated APs and/or from shared APs to sharing AP. In this step, the sharing AP and shared AP may exchange full or limited information for upcoming MAPS transmissions. At step 830, for each minimum required MCS level, the sharing AP may determine a SR table and a resource allocation scheme for all STAs. At step 835, the sharing AP select the SR table (e.g., spatial reuse scenario) and the corresponding resource allocation scheme that requires minimum TX duration or number of PPDUs. At step 840, for each STA, the sharing AP may determine the effective MCS based on actual SR level on the allocated resource. Detailed coordinated multi-AP transmission procedures are described as below. It is assumed that APs can hear each other.

An AP may acquire the channel through channel sensing. The AP may determine to share the channel with all APs or a subset of APs in the AP candidate set or multi-AP set (MAPS). The AP may be referred as a sharing AP.

The sharing AP may determine multi-AP transmission setting by frame exchanges between APs and/or backhaul information exchange between APs.

In one embodiment, the frame exchanges between APs may be part of the TXOP, so that the setting may be different from TXOP to TXOP. In one embodiment, the frame exchanges may happen before the TXOP and the MAP setting may be identified by a temporal ID in the case multiple MAPS may be formed. The temporal ID may be referred in the TXOP so APs and STAs may know MAPS used for the TXOP. Alternatively or additionally, the multi-AP setting may be identified by the AP candidate set ID, AP IDs and/or AP bitmap in the AP candidate set.

The multi-AP transmission setting may include: APs, potential STAs, SINR/pathloss, and/or predetermined minimum required MCS levels (PMRM).

Specifically, the APs may join for coordinated multi-AP transmission in the TXOP.

The potential STAs may be part of the coordinated multi-AP transmission in the TXOP. In one example, each AP may determine its receiving STAs. In one example, each AP may determine its receiving STAs and exchange this information with the other APs.

The SINR or pathloss between each AP-STA pair may be obtained from sounding procedure(s) described above. In one example, each STA may measure the SINR, pathloss, RSSI or other type of channel quality measurements from each AP, and report to its associated AP. In one example, each STA may measure the SINR, pathloss, RSSI or other type of channel quality measurements from each AP, and report to its associated AP and non-associated APs. Alternatively or additionally, each AP may collect the measurements from its associated STAs and exchange this information between each other. Alternatively or additionally, each AP may collect the measurements from its associated STAs and report this information to the sharing AP.

The predetermined minimum required MCS (PMRM) levels may be related with possible multi-AP scheduling schemes. For example, a lower PMRM may allow more chance of multi-AP spatial reuses, and a higher PMRM may allow less chance of multi-AP spatial reuse. The sharing AP may prepare several PMRMs with its intended scheduling targets, and pick the optimum scheduling scheme using certain criteria. (e.g., maximize total throughput, reduce latency for some traffic etc.).

The sharing AP may go through all PMRMs, and for each PMRM.

A potential spatial reuse table (SR table) for all STAs may be determined for the PMRM. The exemplary SR table is given in Table 3. In this table, each STA may have one entry. In this entry, the APs allowed to perform spatial sharing are included. For example, STA1 may be associated with AP1, and with the minimum required MCS level, STA1 may still be able to decode the reception from AP1 with the PMRM while AP2, SP3, and AP4 are performing concurrent transmission or spatial reuse transmission. STA2 may be associated with AP2, and it may be able to decode while AP4 is transmitting.

TABLE 3

Exemplary SR table for PMRM 1

| STA1 | {AP2, AP3, AP4} |
|---|---|
| STA2 | {AP4} |
| ... | ... |

Based on the SR table and association table (e.g., association table may indicate the transmitting AP/associated AP for each STA in the coordinated MAP transmissions/spatial reuse MAP transmissions), the AP may determine a resource allocation plan for all STAs with this PMRM. The resource allocation may be implementation related. In one method, the AP may reuse the resource in spatial domain as much as possible. The outcoming resource allocation may be with one or more PPDU with shared subchannels as shown in Table 4. In this example, a resource allocation in one PPDU with 4 subchannels are given. If one PPDU may not be enough to carry traffic to all STAs, more PPDUs may be scheduled. AP1 and AP4 may perform spatial reuse transmissions to STA1 and STA4 respectively on Channel 1. AP2 and AP4 may perform spatial reuse transmissions to STA2 and STA6 respectively on Channel 2. AP3 may transmit to STA5 on Channel 3 and so on.

TABLE 4

Exemplary resource allocation table for PMRM 1 and PPDU 1

| PMRM 1, PPDU 1 | Ch1 | Ch2 | Ch3 | Ch4 |
|---|---|---|---|---|
| AP1 | STA1 | | | ... |
| AP2 | | STA2 | | ... |
| AP3 | | | STA5 | ... |
| AP4 | STA4 | STA6 | | ... |

Based on the resource allocation table, and SINR/Pathloss/RSSI between each pair of AP-STA, the sharing AP may estimate the effective SINR for each STAs, and thus estimate the MCS for each STAs. The AP may estimate the number of OFDMA symbols needed to carry data for each STA, and therefore PPDU duration.

The AP may go through all the PMRMs and pick a resource allocation scheme based on certain criteria, for example, minimum PPDU duration.

The sharing AP may transmit the resource allocation information to the shared APs. The sharing AP may carry that in a multiple-AP trigger frame or other type of frames.

Figure 9:
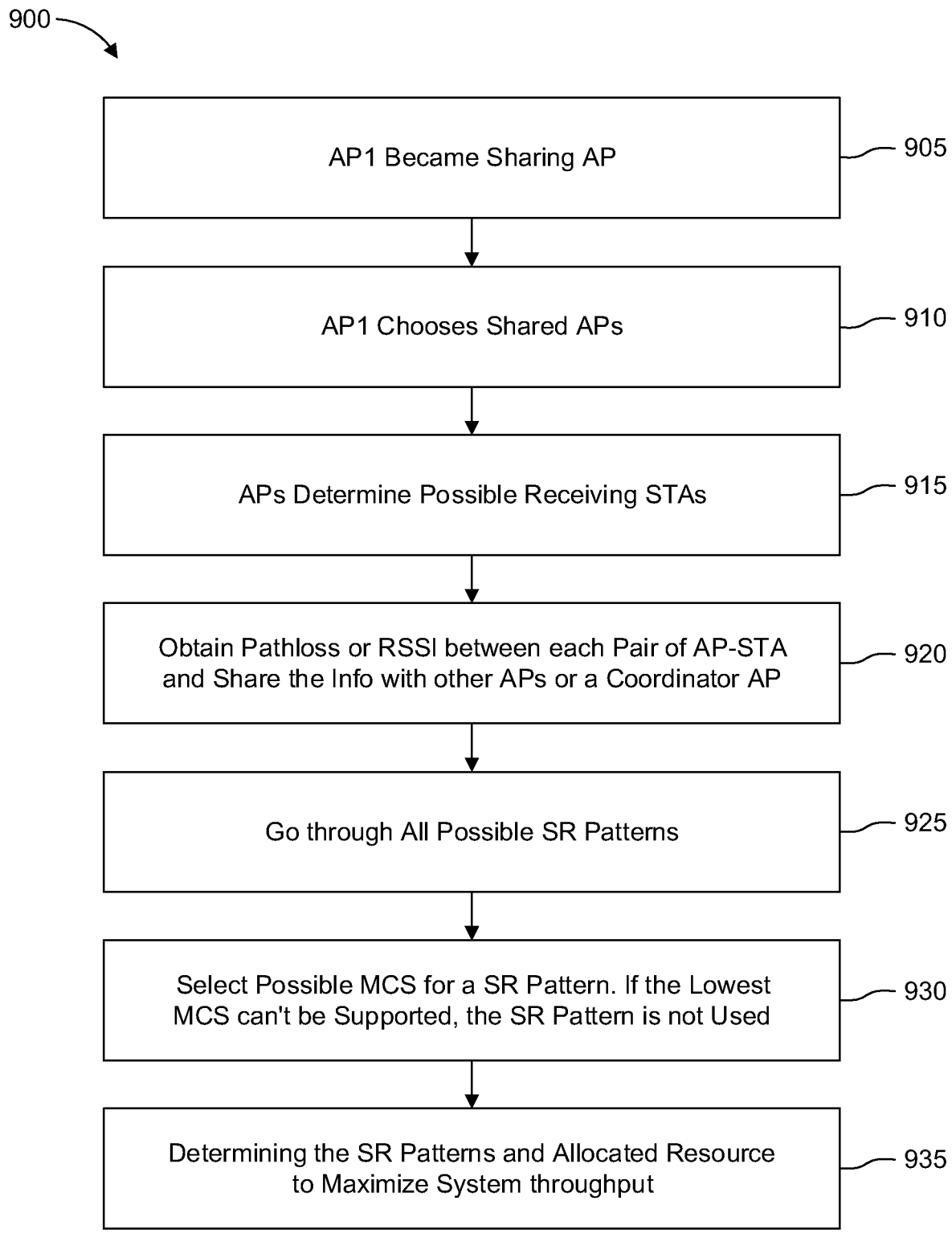
FIG. 9 is a diagram illustrating another example coordinated multi-AP transmission procedure.

FIG. 9 illustrates another example coordinated MAP transmission procedure 900, which may be used in combination with any of other embodiments described herein. As illustrated in FIG. 9, at step 905, an AP (e.g., AP 1) may become a sharing AP. At step 910, the sharing AP may choose one or more shared APs in a MAPS. At step 915, each shared AP may determine possible receiving STAs. At step 920, the sharing AP may obtain pathloss or RSSI or SINR or other measurements between each pair of the shared AP and the STA and share the information with other APs or the coordinating AP. At step 925, the sharing AP may go through all possible SR patterns/tables. At step 930, the sharing AP may select possible MCS for an SR pattern. If the lowest MCS cannot be supported, the SR patter may not be used. At step 935, the sharing AP may determine the SR patterns and allocated resources to maximize system throughput or minimize the system latency. Detailed coordinated multi-AP transmission procedures are described as below. It is assumed that APs can hear each other.

APs may share their candidate STAs with suitable MCS info under different spatial reuse (SR) patterns to other APs in the coordinated AP set. Either a centralized AP or a sharing AP or an AP may construct an allocation table such as in Table 4. The construction of the allocation may be an optimization problem to solve with certain constraints and objectives. For example, the constraints may be certain STAs may not be scheduled under certain SR pattern due to excess interference, or a minimal allocation for each candidate STA. The objective may be to maximize the throughput of the coordinate AP set, as illustrated in FIG. 9.

If the allocation table is calculated in a distributed manner by each AP, then objective or constraint may include ordering criteria. For example, the binary decision variable (whether each STA is to be scheduled on a channel) may be represented by a number x to jointly reflect the schedule on a channel, and the constraint may enforce an order that one channel's x value to be greater than or equal to the x value of a next channel. The ordering may ensure different AP construct a scheduling decision whose SR pattern is identical to other AP's decision.

Comparing to the embodiment illustrated in FIG. 8, the scheduling AP/sharing AP may know all the information, such as traffic size, RSSI/SINR/pathloss, or the like for each STA. The scheduling AP/sharing AP may go through all possible SR patterns. For each STA, the AP may select an MCS for the STA based on the estimated effective SINR with the SR pattern. The AP may determine a set of SR patterns for the STAs with a resource allocation plan which may maximize the localized system throughput or minimize the transmit duration.

Embodiments for coordinated multi-AP sounding and set-up procedures are described herein. In order to perform coordinated multi-AP transmissions described above, certain information may need to be exchanged between APs and STAs, or APs and APs. In this embodiment, the following two-step sounding and setup procedure as an example may be used:

Each STA may measure the channel measurements/SINR/SNR/RSSI/Pathloss from its neighboring APs using frames transmitted with known transmit power. For example, beacon frames, sounding frames, etc. The STA may report the information (shown in below table) to its associated AP. The report may be carried in a MAC header, for example, in a control field or the like, and transmitted together with any frame which may carry the control field. Alternatively or additionally, it may be carried in a control/action/management frame. It is also noted that other types measurement related to signal strength, channel quality and/or interference level may be used herein.

TABLE 5

Exemplary SNR/RSSI/PL measurement table

|       | AP1          | AP2          | AP3          | AP4          |
|-------|--------------|--------------|--------------|--------------|
| STA 1 | SNR/RSSI/ PL | SNR/RSSI/ PL | SNR/RSSI/ PL | SNR/RSSI/ PL |

Figure 10:
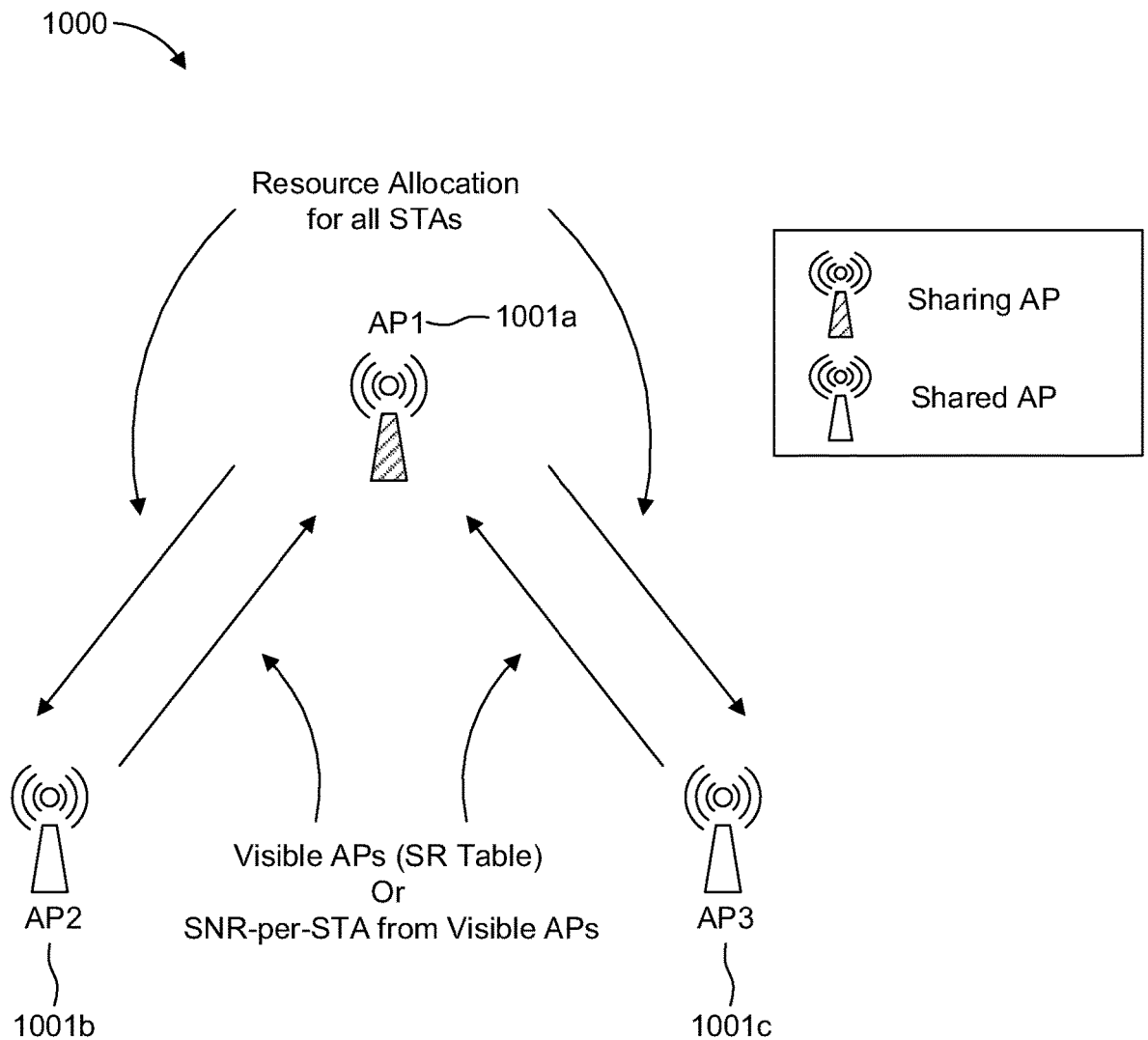
FIG. 10 is a diagram illustrating an example frame exchanges between APs.

FIG. 10 illustrates an example frame exchange between APs, which may be used in combination with any of other embodiments described herein. As illustrated in FIG. 10, a sharing AP (e.g., AP 1 1001*a*) may send resource allocation for STAs. The shared APs (e.g., AP 2 1001*b* and AP 3 1001*c*) may send back information of the visible APs (or SR table) or SNR-per-STA from visible APs. Detailed frame exchange between APs are described as below.

The AP may determine to participate a coordinated multi-AP transmission as a shared AP. The APs may exchange necessary information for the sharing AP to perform multi-AP scheduling. The frame exchanges between APs may include following steps.

The sharing AP may transmit a frame to one or more shared AP to request the coordinated multi-AP related information. The sharing AP may carry below information:

The sharing AP may set a desired spatial reuse (SR) level so that the shared AP may provide spatial reuse table accordingly. The desired SR level may be a predetermined minimum required MCS (PMRM) level.

The sharing AP may request information from the shared APs. The sharing AP may indicate what information it may requested. For example, the sharing AP may request SINR/SNR/Pathloss measurement between each pair of AP-STA. Alternatively or additionally, the sharing AP may request SR table which may indicate the potential SR APs allowed by a STA. Alternatively or additionally, the sharing AP may supply a list of potential shared APs and request MCS table which may indicate the potential allowed MCS when a pattern of APs are transmitting with certain powers. For example, for a shared AP 2 with sharing AP 1 and other potential shared AP 3, AP 4, and with STA 2-1, STA 2-2 associated with shared AP 2 for which AP 2 intends to schedule, the suitable MCS for AP TX pattern assuming a TX power (AP 2), (AP 1, AP 2), (AP 3, AP 2), (AP 1, AP 2, AP 3), . . . may be reported by AP 2 for STA 2-1, STA 2-2 to AP 1.

The sharing AP may indicate the shared channels. The sharing AP may request each shared AP to report the available channels. For example, the sharing AP may indicate that it may acquire {ch1, ch2, ch3, ch4} for the coordinated multi-AP transmission and ask the shared APs to indicate the availability on those channels.

The shared AP may respond with potential receiving STAs associated with the AP in the upcoming coordinated multi-AP transmission.

If a sharing AP may request a SR table report, one or more SR tables based on the PMRMs may be set by the sharing AP. The SR table may be shown in Table 3. Alternatively or additionally, it may be show in Table 6. A value 1 may indicate that the STA may allow the AP to transmit when it may receive its desired AP. For example, STA 1 and STA 2, which are the potential receiving STAs from AP 2 (e.g., they are both associated with AP2). Table 6 may be the report from AP 2 to the sharing AP. In this table, AP 2 may indicate that STA 1 may allow SR transmission from AP 1 and AP 3 when it receive transmission from AP 2. STA 2 may allow SR transmission from AP 3 and AP 4 when it receive transmission from AP 2.

TABLE 6

SR table transmitted from a shared AP to the sharing AP for a given PMRM

|      | AP1 | AP2 | AP3 | AP4 |
|------|-----|-----|-----|-----|
| STA1 | 1   | 1   | 1   | 0   |
| STA2 | 0   | 1   | 1   | 1   |

If a sharing AP may request a full SNR/Pathloss/RSSI measurement report, a SNR/Pathloss/RSSI table may be sent from the shared AP to one or more sharing APs. The SNR/Pathloss/RSSI table may be shown in Table 7. In this example, STA 1 and STA 2, which are the potential receiving STAs from AP 2 (e.g., they are both associated with AP 2). Each entry in Table 7 may indicate the SNR/Pathloss/RSSI between the pair of AP-STA. A value For example, value 0 may be used to indicate the link quality between the pair is below a predefined threshold. In another word, the STA may not receive transmission from the AP. It is also noted that other types measurement related to signal strength, channel quality and/or interference level may be used herein.

TABLE 7

SNR/Pathloss/RSSI table transmitted from a shared AP to the sharing AP

|      | AP1              | AP2              | AP3              | AP4              |
|------|------------------|------------------|------------------|------------------|
| STA1 | SNR/Pathloss/RSSI | SNR/Pathloss/RSSI | SNR/Pathloss/RSSI | SNR/Pathloss/RSSI |
| STA2 | . . .            | . . .            | . . .            | . . .            |

If a sharing AP may request an MCS report, an MCS table may be sent from a shared AP to the sharing AP.

For example, AP 1 is the sharing/computing AP, AP 2, 3, 4 are potential shared APs. AP 2 intends to schedule associated STA 2-1 . . . STA 2-N. The shared AP 2 may send the following Table 8.

TABLE 8

MCS table transmitted from a shared AP to one or more sharing APs

| AP pattern            | STA2-1 MCS/rate | . . . | STA2-N MCS/rate |
|-----------------------|-----------------|-------|-----------------|
| AP2                   | MCS_1, 1        | . . . | MCS_1, N        |
| AP1 + AP2             | MCS_2, 1        | . . . | MCS_2, N        |
| . . .                 | . . .           |       | . . . . . .     |
| AP1 + AP2 + AP3 + AP4 | MCS_K, 1        | . . . | MCS_K, N        |

In this table, for example, MCS_K,1 is the best/suitable rate for STA 2-1 under the AP TX pattern in which all AP 1, 2, 3, 4 are transmitting with a known power.

The sharing AP may use this information, to further derive what would be a suitable MCS under a specific AP TX pattern if the transmitting APs' power are deviated from the know power. For example, MCS_1,1=x corresponds to a SNR threshold SNR_x and MCS_2,1=SNR_y. If AP 2 increases its TX power by m dB and AP 1 decrease its TX power by n dB, then based on x, y the sharing AP may calculate another set of MCSs for STA 2-1 under the adjusted powers of AP 1 and AP 2.

Furthermore, the shared AP may report an outer loop rate control information for reported STAs if the reported STAs are experiencing different fading channels. For example, MCS_K,1=x may correspond to a SNR threshold SNR_x,1 for STA 2-1, but MCS_K,N=x may correspond to a different SNR threshold SNR_x, N, for STA 2-N. The SNR threshold SNR_{MCS}_{STA id}, or values represent the mapping may be reported.

Furthermore, the shared AP may report an outer loop rate control information for reported STAs if the reported STAs are experiencing different fading channels. For example, MCS_K,1=x may correspond to a SNR threshold SNR_x,1 for STA 2-1, but MCS_K,N=x may correspond to a different SNR threshold SNR_x, N, for STA 2-N. The SNR threshold SNR_{MCS}_{STA id}, or values represent the mapping may be reported.

Furthermore, each entry in the table may be accompanied by a SNR margin to the MCS value of the entry. For example, (MCS_K,1, y dB) may mean the SNR of STA 2-1 may be further decreased by y dB but STA 2-1 may still receive PPDU correctly with high probability using MCS_K,1.

The shared AP may respond with channel availability. Each shared AP may indicate the channel/subchannel availability given the sharing AP acquired channels. For example, the sharing AP may acquire {ch1, ch2, ch3, ch4} for the coordinated multi-AP transmission. Each AP may report a channel availability. In one embodiment, a shared AP may report the available or non-available channels which may be a subset of the acquired channels. In one embodiment, the shared AP may report a bitmap. In this example, the bitmap may be with length n (e.g., length 4) and each bit may indicate if the channel is available for the AP.

As illustrated in FIG. 10, the sharing AP (e.g., AP 1 1001a) may perform resource allocation/scheduling algorithm, and send the scheduling table to shared APs (e.g., AP 2 1001b and AP 3 1001c). On example of the scheduling table is shown in Table 4. The sharing AP may also indicate the transmit power used by each shared AP in the upcoming coordinated multi-AP transmissions. The transmit power setting may be per AP and/or per frequency resource and/or per STA. For example, as shown in Table 4, frequency resource channel 1 is assigned for AP 1 to transmit to STA 1 and AP 4 to transmit to STA 4. In one embodiment, the sharing AP may assign transmit power for AP 1 and AP 4 on channel 1. In one embodiment, the sharing AP may allow AP 1 and AP 4 to use the same transmit power to transmit. The transmit power may be chosen to be the minimum power which may cover the desired receiving STAs. In one embodiment, the sharing AP may set different power to AP 1 and AP 4 based on information exchanged between APs such as traffic info, and SNR/SINR/Pathloss information. For example, AP 1 may be assigned with a higher transmit power than AP 4 and therefore AP 1 may transmit with higher MCS. The sharing AP may choose the power carefully such that AP 4 may still use basic MCS to transmit to STA 4. The power control can be part of scheduling algorithm. Thus, the scheduling table and power allocation may be generated after the scheduling method.

The shared AP may determine the MCS for its desired STAs based on the scheduling table and transmit power set by the sharing AP.

Simulation results are described herein. In the basic coordinated OFDMA, if a sub-channel (or an RU) is occupied by one AP, other APs in the AP candidate set may not use it to maintain perfect orthogonality in frequency domain if zero inter-BSS interference is not possible. However, perfect zero interference may not be necessary, as long as certain SNR level can be achieved for a desired MCS level, which provides opportunity for spatial reuse.

Figure 11:
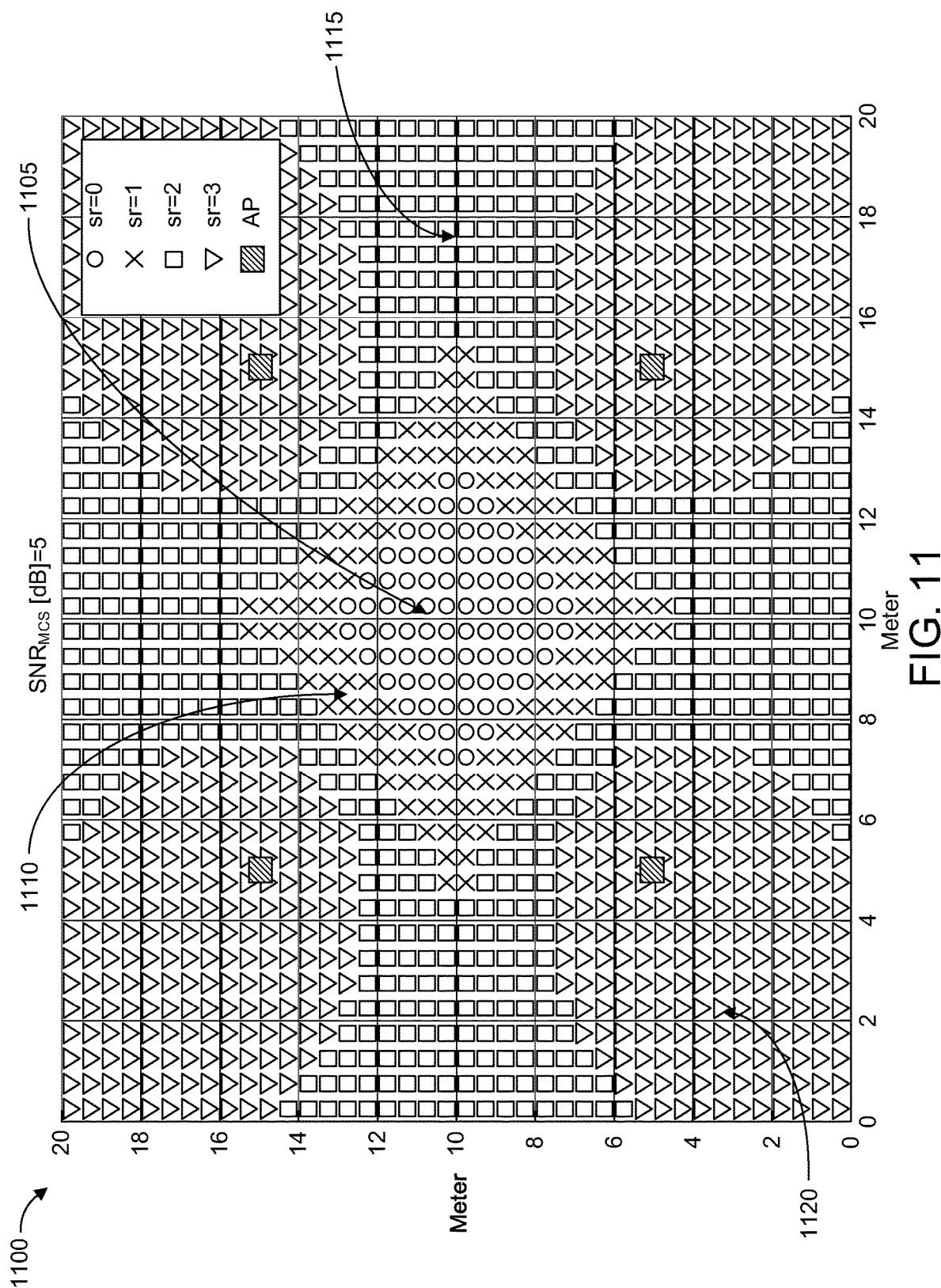
FIG. 11 is a diagram illustrating an example spatial reuse (SR) coverage map when predetermined minimum required SNR is set to 5 dB.
Figure 12:
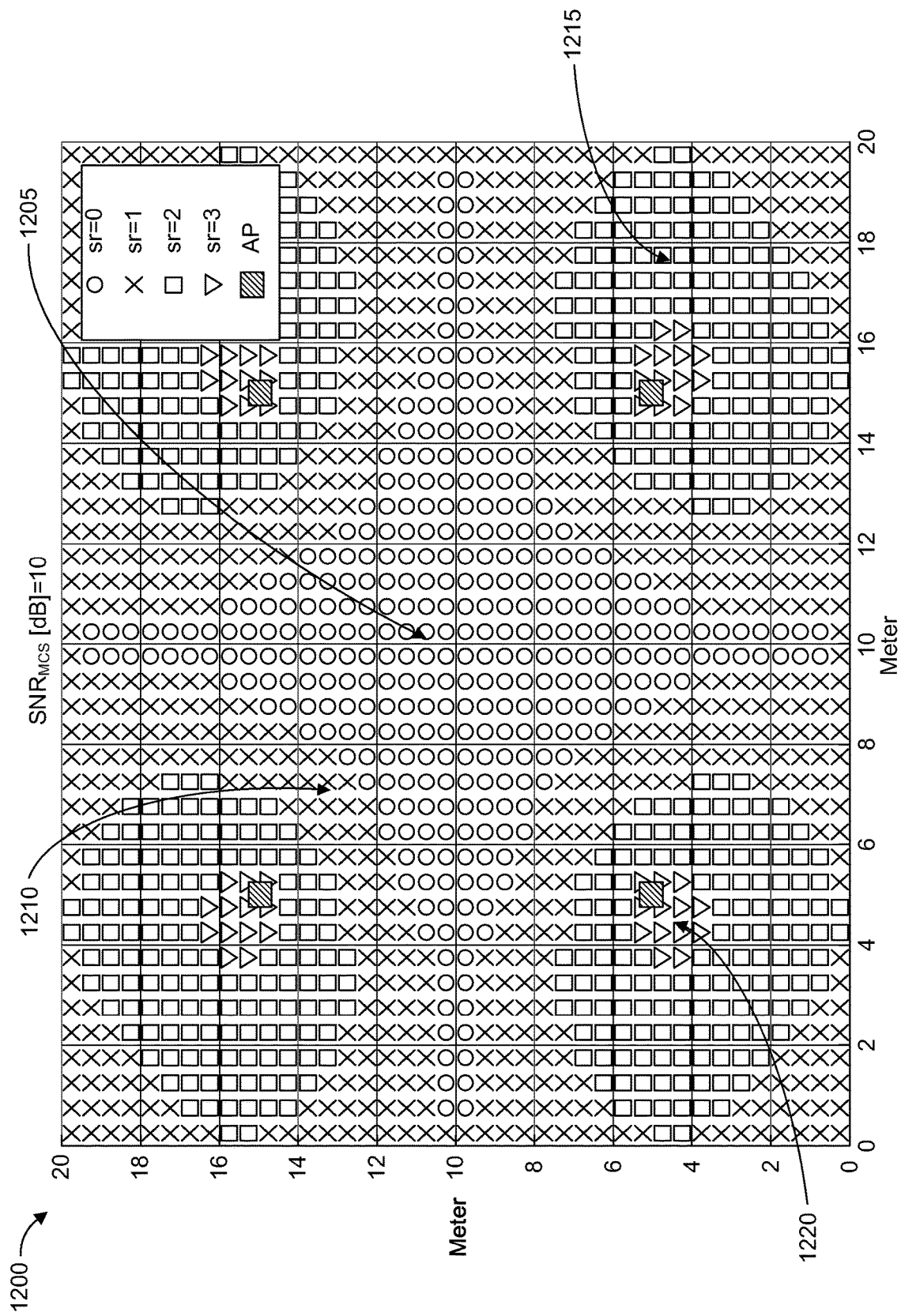
FIG. 12 is a diagram illustrating an example SR coverage map when predetermined minimum required SNR is set to 10 dB.

FIGS. 11 and 12 are example spatial reuse (SR) coverage maps 1100, 1200 when predetermined minimum required SNR is set to 5 dB and 10 dB, respectively, which may be used in combination with any of other embodiments described herein. In multi-AP scenario, the "SR coverage" of APs may have many different patterns in terms of number of (or which) other APs that can transmit at the same time as shown in FIGS. 11 and 12. In these figures, predetermined minimum required SNR is set to 5 dB and 10 dB respectively. Multiple (e.g., four) APs are assumed with following simulation assumptions:

Scenario: Office space

4 APs on 3m high ceiling

Tx power from each AP: 20 dBm,omni directional

Pathloss model $PL(d)=40.05+20*\log 10(fc/2.4)+20*\log 10(\min(d, 10))+(d>10)*35*\log 10(d/10)$ $fc=5$ GHz AWGN channel,NF=7 dB Total 80 MHz channel bandwidth with 4×20 MHz RUs DL transmission Traffic Type: Full Buffer A scheduler manages resource usage @ the sharing AP Each AP randomly selects 2 associated STAs before scheduling. Each STA has one antenna, thus can support one data stream transmission The FIGS. 11 and 12 show that in order to achieve SINR equal or greater than the predetermined minimum required SNR (e.g., 5 dB and 10 dB respectively), the spatial reuse coverage area of each potential STA may drop. The STAs located in the circle areas 1105, 1205 with legend sr=0 cannot allow any non-associated AP to transmit concurrently with its associated AP. The STAs located in the crossing areas 1110, 1210 with legend sr=1 can allow one non-associated AP to transmit concurrently with its associated AP. The STAs located in the square areas 1115, 1215 with legend sr=2 can allow two non-associated AP to transmit concurrently with its associated AP. The STAs located in the triangle areas 1120, 1220 with legend sr=3 can allow three non-associated AP to transmit concurrently with its associated AP.

The detailed SR coverage map may depend on TX power, required MCS level, relative distances among APs, RF radiation pattern etc. In above FIGS. 11 and 12, it is assumed that the same TX power (e.g., 20 dBm) from each AP. It is observed that spatially reusable area may be large. Therefore, when coordinated OFDMA (C-OFDMA) is enabled, combining it with coordinated SR (C-SR) may enhance overall system throughput performance.

Figure 13:
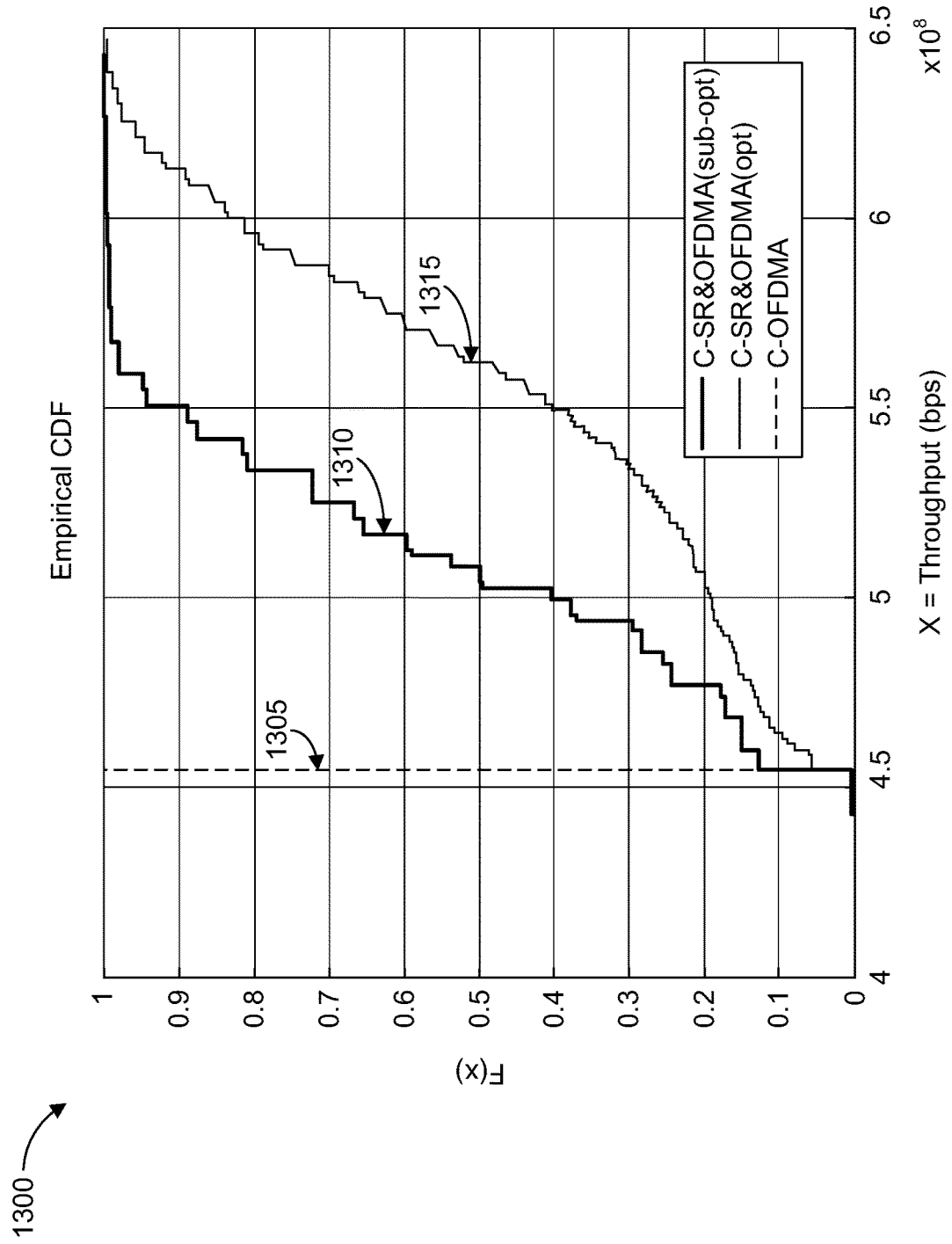
FIG. 13 is a diagram illustrating an example throughput comparison between different scheduling schemes.

FIG. 13 illustrates an example throughput comparison 1300 between different scheduling schemes, which may be used in combination with any of other embodiments described herein. As illustrated in FIG. 13, three different scheduling methods are compared:

In coordinated OFDMA 1305, each AP may be able to allocate 20 MHz subchannel to one user.

In coordinated SR and coordinated OFDMA with optimal method 1315, all possible SR patterns, MCS levels and resource allocations may be considered. A SR pattern and resource allocation that maximizes the sum rate are determined and subject to: one RU that can be allocated to at most one STA within a BSS per PPDU; and a STA will not be scheduled with SR if the SINR is too low such that MCS0 cannot be achieved. Integer programing technique may be used.

In coordinated SR and coordinated OFDMA with sub-optimal method 1310, based on received simple SR tables (includes logic "0" or "1") from shared APs, resource allocation schemes may be determined for a moderate MCS level (e.g., MCS4) which can provide a good trade-off between pure SR and pure OFDMA.

Base on the simulation, with coordinated OFDMA case, all STAs can use the highest MCS for single data stream. Up to 25% improvement in total throughput at 50% case if coordinated SR is added on top of coordinated OFDMA. Sub-optimal embodiment (i.e., low overhead) can also provide improvement (~12% @median) with limited measurements and feedback.

Embodiments for multi-AP set as a full-duplex AP are described herein.

Figure 14:
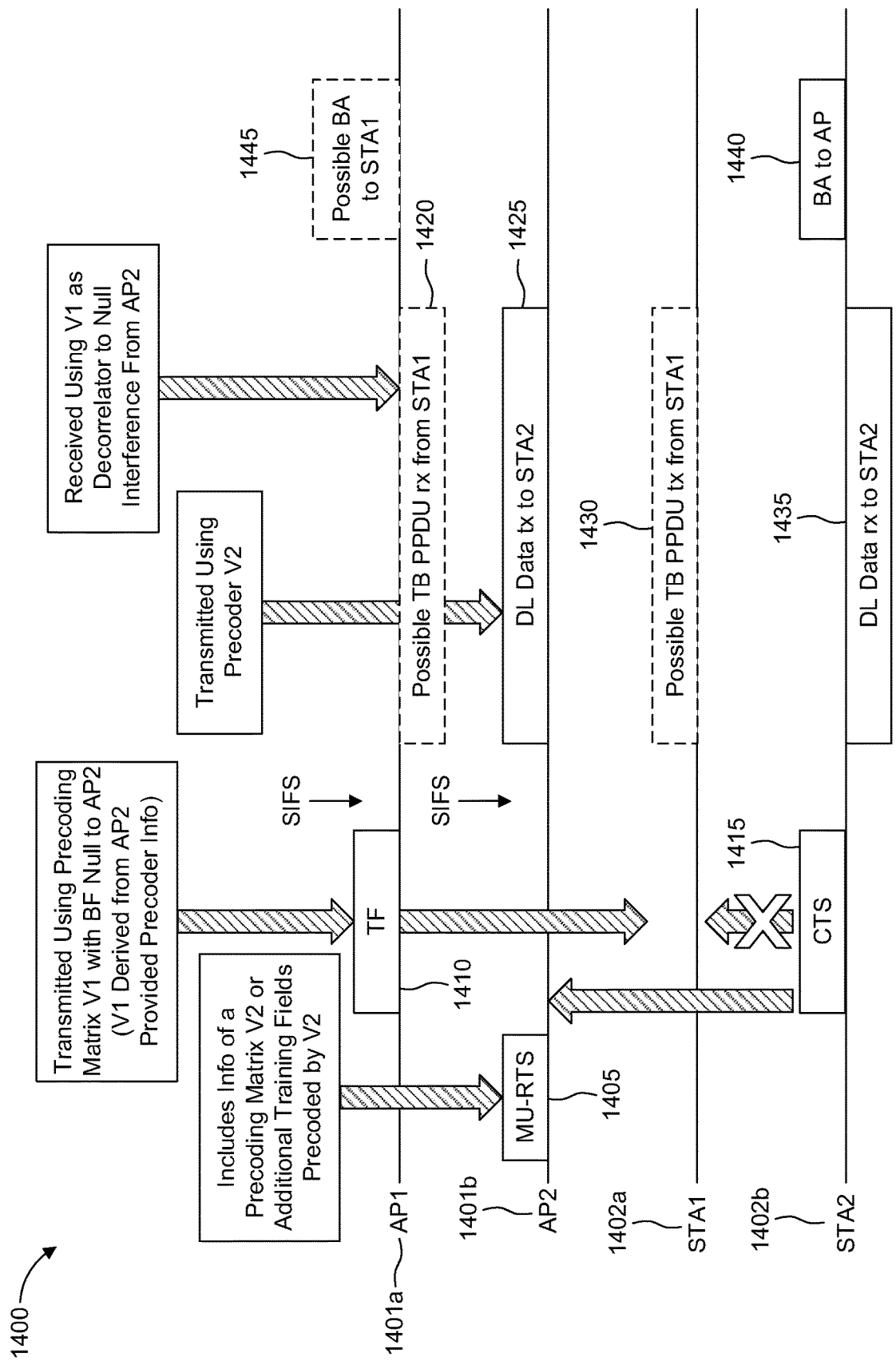
FIG. 14 is a diagram illustrating an example scenario where a multi-AP set coordinates and works as a full-duplex AP.

FIG. 14 illustrates an example scenario 1400 where a multi-AP set coordinated and worked as a full-duplex AP, which may be used in combination with any of other embodiments described herein. The extension of multi-AP set as a full duplex AP illustrated in FIG. 14 may be applied to the example shown in FIG. 4. In this example scenario 1400, AP 2 1401b is transmitting and AP 1 1401a may be receiving at the same time-frequency resource(s). It is noted that the embodiment described in or related to FIG. 14 may be applicable to other embodiments for the system to achieve a full duplex TXOP.

As illustrated in FIG. 14, AP 2 1401b (as a TXOP holder/responder or multi-AP coordinator/coordinatee) may send a setup frame such as a MU-RTS/RTS frame 1405, or s separate setup frame preceding or following the MU-RTS/RTS frame 1405. The setup frame may not be transmitted with any precoding matrix. The setup frame may include a precoding matrix info V2 or a set of precoding matrices to be used by AP 2 1401b for the following data transmission. AP 1 1401a which is aware of the MIMO channel H12 from AP 2 1401b to AP 1 1401a may derive a new channel matrix H12B=H12*V2 which may be the interference channel in the data transmission duration that AP 2 1401b may transmit to its targeted STA (e.g., STA 2 1402b). AP 1 1401a may derive a precoding matrix V1 or a set of precoding matrices which places a beamforming null to AP 2 1401b to be used in the data transmission duration. For example, AP 1 1401a may derive V1 as a subset of the null space of (H12B)', or derive V1 by using other techniques such as MUSIC/PCA algorithms based on the column vectors of H12B.

Alternatively or additionally, V2 may not be explicitly signaled but additional training fields/pilots sent with the setup frame identifies H12B. For example, AP 2 1401b may transmit the initial frame (e.g., MU-RTS/RTS frame) with two reference symbols. The first reference symbol may not be precoded and may be used for channel estimation (e.g., LTF symbols). The second reference symbol may be precoded with V2 or a set of matrices (e.g., the second reference symbol may be inserted to the PPDU or appended to the end of the PPDU). By comparing the channel estimated using the two reference symbols, the receiver (e.g., AP1) may be able to estimate the precoding matrix V2 or precoding matrices.

AP 1 1401a may send a trigger frame (TF) 1410 beamformed/precoded using the derived V1 such that AP 2 1401b may not be interfered with this transmission. Alternatively or additionally, AP 1 1401a may have priori CSI information with its associated STAs such that AP 1 1401a knows which STAs (e.g., STA 1 1402a and/or STA 2 1402b) are reachable by the beamformed TF 1410. AP 1 1401a may transmit the TF with a precoding scheme which may enhance the transmit power to the direction of the targeted STA(s) and at the meantime null the direction of AP 2 1401b. And the TF 1410 may schedule UL transmission of subset of these STAs (e.g., STA 1 1402a and/or STA 2 1402b). Alternatively or additionally, the TF 1410 may schedule UORA RUs such that a STA (e.g., STA 1 1402a and/or STA 2 1402b) which is able to receive the TF 1410 may perform UL random access on a UORA RU. Because the TF 1410 is beamformed/precoded, it may not interfere with AP2's reception of CTS (responding) frame from STA 2 1402b. The CTS (responding) frame 1415 may be power controlled based on the pathloss between AP 2 1401b/STA 2 1402b, or may be transmitted with a pre-determined power.

STA 1 1402a may perform a test (e.g., based on the reception quality of TF, channel reciprocity and/or the a priori info of STA 2's 1402b transmission power of CTS/responding frame) to determine whether its transmission will interfere with the reception of STA 2 1402b. If not, it may proceed to respond to the TF 1410. The responding TB-PPDU 1430 may be power controlled based on the pathloss info between STA 1 1402a/AP 1 1401a and/or STA 1 1402a/STA 2 1402b.

AP 1 1401a then may switch to reception mode (e.g., receive TB PPDU 1420) and may use V1 as a decorrelator to separate the signal of TB-PPDU from STA 1 1402a from the interference of DL data from AP 2 1401b. AP 2 1401b may switch to transmission mode (e.g., transmit DL data 1425) and may use V2 as a precoder to avoid interfering to AP 2's 1401b reception and beamform DL data to STA 2 1402b. STA 2 1402b may receive the DL data 1435 from AP 2 1401b. AP 1 1401a may transmit a block acknowledgement (BA) 1445 to STA 1 1402a. STA 2 1402b may transmit a BA 1440 to APs 1410a, 1401b.

The above embodiment assumes that the transmitter AP 2 1401b provides V2 to the reception AP 1 1401a, and AP 1 1401a may use the resulting channel to derive V1. Alternative or additionally, the reception AP 1 1401a may provide V1 to transmitter AP 2 1401b (e.g., explicitly signal V1 or using training fields/pilots as described above) and the transmitter AP 2 1401b may use the resulting channel to derive V2.

Embodiments for NAV setting procedures are described herein.

A STA may continue to use multiple (e.g., 2) NAV timers, one for intra-BSS, one for inter-BSS. While participate in a TXOP with a holder being OBSS AP, the STA may check both intra-BSS NAV and basic/inter-BSS NAV before responding to a TF, for example, not responding if any NAV is busy. The terms inter-BSS NAV and basic NAV may be used interchangeably throughout this disclosure.

An OBSS AP which intends to perform frame exchange with a STA not associated with itself, may provide the STA with a list of zero or more of NAV values corresponding to multiple APs, and/or a list of the BSSID/color associated with these NAVs for comparison with the STA's basic NAV. These NAVs may be the most recent (intra-)BSS NAV values of its own BSS and neighboring BSSs that the STA may ignore when responding to the OBSS AP's TF. If no NAV and associated BSS color is provided, the STA may assume that there is no pending NAV from the BSS of the OBSS AP before the OBSS TXOP.

In one example, if the STA's basic NAV matches one of the NAV values in the list, or the last frame/PPDU which updated the basic NAV was from the BSS of the OBSS AP or one of the BSS identified in the list, the STA may reset basic NAV to 0 (i.e., basic NAV indicates idle).

In another example, if the STA's basic NAV is greater than any of the NAV value in the list provided by the AP which may include the OBSS APs' NAVs, then the STA may keep the value of basic NAV and continues counting down (i.e., basic NAV indicates busy).

In another example, if the STA's basic NAV is less than at least one of the NAV values in the list, the STA may reset the basic NAV to 0. The STA may keep the basic NAV value to continue countdown if the most recently updated basic NAV was due to a frame sent by a transmitter not belonging to the list of BSSID/BSS color which was provided by the OBSS AP.

The STA may not keep updating basic NAV when receiving frame/PPDU with the BSSID/color belong to the OBSS AP which is the TXOP holder and the STA is participating the TXOP. The STA may keep updating its intra-BSS NAV while participating an OBSS AP's TXOP. The STA may respond to OBSS AP's TF subject to both intra-BSS and basic NAV check (e.g., after the basic NAV was updated in procedure the above) if CS required. The OBSS AP may request a STA only to check one of the basic NAV or intra-BSS NAV when responding a TF with CS required set to 1. In such case, the STA may not perform the other type of NAV check before responding. The frame(s) from an OBSS AP which is the holder of the TXOP, may include a signature from the AP to which the STA is associated. When requested to ignore intra-BSS NAV/basic NAV or rest basic NAV by comparison, the STA may check the validity of such signature before responding with a TB-PPDU or reset basic NAV. On finishing the frame exchange with an OBSS AP, the STA may update it basic NAV to the value based on the latest OBSS frame if its duration is greater than the current basic NAV value.

When participating an OBSS AP's TXOP, the STA's basic NAV may not be updated by the frames/PPDUs from the OBSS AP's BSS, but may be updated by the frames/PPDUs from other OBSS.

Embodiments for buffer status report (BSR) are described herein.

A new A-control field may be defined to support BSR with TID granularity. The new A-control may have similar structure as the current BSR control. The new or existing A-control may be used for BSR or traffic indication for DL or UL.

The new A-control may have a bitmap which provide at least a binary indication of whether traffic of each TID is buffered.

In one example, the new A-Control field may carry buffer status information/report for one or more links. The term link may refer to frequency band(s) and/or channel(s) throughout this disclosure. In the new A-control, a subfield may identify the pattern of TID-link mapping. For example, 1001 indicates TIDs that mapped to link 1 and link 4 are reported in this new A-control. Alternatively or additionally, a subfield may identify a link such that TIDs mapped to this link are reported in this new A-control.

A subfield in this new A-control may identify a TID and a queue size field may indicate the queue size of the TID.

The TID of a QoS frame (e.g., a QoS null frame with TID signaled in QoS control) may implicitly signal the TID for a queue size subfield in the new or existing BSR A-control. In this case, the queue size field may represent the queue size of the TID.

A set of bits (e.g., bit 8-15) in QoS Control may be combined with A-control to form a new control to provide more detailed buffer status with higher granularity related a subset, or all TIDs.

In a QoS Null frame, a set of bits (e.g., bit 8~15) in QoS Control or sequence control may be combined with A-control to form a new control to provide more detailed buffer status with higher granularity related a subset, or all TIDs.

In a trigger frame or a PPDU carrying a trigger frame, an indication may signal that the UORA access responding to the trigger frame on the link carrying the trigger frame may be (e.g., partially) restricted/prohibited for the MLDs which have another enabled/reachable link(s). The identity of another link may be signaled in the trigger frame/PPDU. Alternatively or additionally, such restriction and/or identity may be signaled in a broadcast frame preceding the trigger frame. In a trigger frame or a PPDU carrying a trigger frame, an indication may signal that the UORA access responding to the trigger frame may be (e.g., partially) restricted/prohibited for certain TIDs. Alternatively or additionally, such restriction may be signaled in a broadcast frame preceding the trigger frame. An UORA TB-PPDU may be used to carry a frame comprising the new or existing BSR described above.

MU-EDCA timer may be defined on a TID granularity. A MU-EDCA timer for a TID/AC may be applicable on an MLD level such that all links to which a TID/AC mapped, may use the same MU-EDCA timer instance for the EDCA access of the TID/AC. A MU-EDCA timer for a TID/AC may be applicable on a per-link level such that each link to which a TID/AC mapped have a different MU-EDCA timer instance for the EDCA access of the TID/AC.

Figure 15:
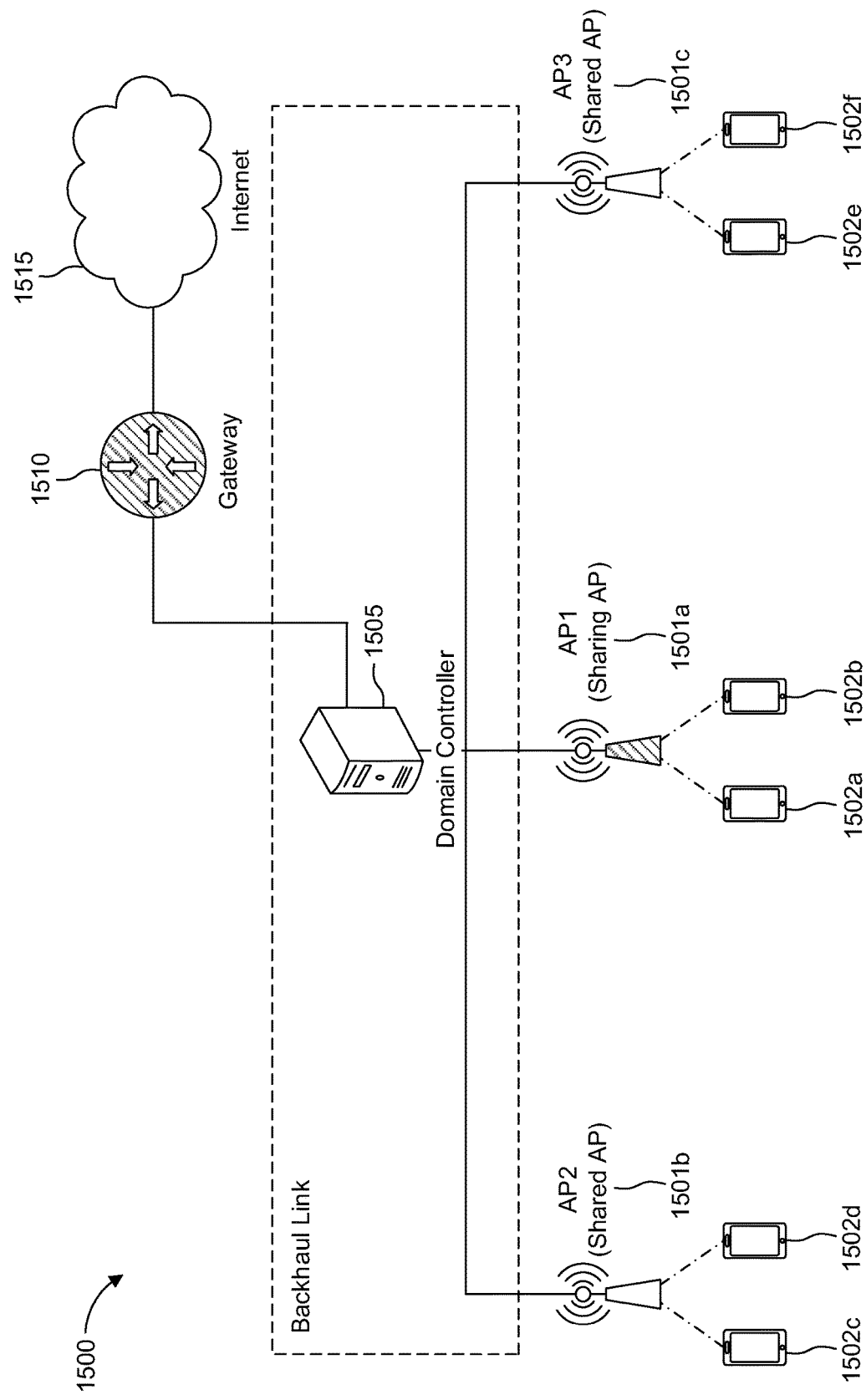
FIG. 15 is a diagram illustrating an example of multiple APs with wired backhaul connection.

Embodiments for coordinated multi-AP sounding procedure with wired backhaul are described herein. FIG. 15 illustrates an example of Wi-Fi networks or multi-AP with wired backhaul connection. As illustrated in FIG. 15, the domain controller 1505 which is a server may be connected with APs 1, 2, 3 1501a, 1501b, 1501c via a wired link, which may be used in combination with any of other embodiments described herein. The domain controller 1505 may also be connected with the gateway 1501 and the Internet 1515 via a wired link. Each of the multiple APs 1, 2, 3 1501a, 1501b, 1501c may be connected with STAs 1502a, 1502b, 1502c, 1502d, 1502e, 1502f via wireless links.

It is assumed that AP 1 1501a obtains the medium via a contention process and becomes TXOP owner. It then may send a "Coordination Request" frame to other shared AP candidates (e.g., AP 2 1501b, AP 3 1501c) in an AP candidate set in the network via the wired backhaul. At the same time or after a time offset, AP 1 1501*a* may send a sequence of NDPs via wireless link to allow all STAs (e.g., STAs 1502*a*, 1502*b*, 1502*c*, 1502*d*, 1502*e*, 1502*f*) in the network to make measurements and to keep the medium busy. The length of the NDPs may be included in the "Coordination Request" frame sent by AP 1 1501*a*, which may be forwarded to all STAs (e.g., STAs1502*a*, 1502*b*, 1502*c*, 1502*d*, 1502*e*, 1502*f*) via their associated APs 1(e.g., APs 1501*a*, 1501*b*, 1501*c*). The length of the NDPs may be for STAs (e.g., STAs 1502*a*, 1502*b*, 1502*c*, 1502*d*, 1502*e*, 1502*f*) and their associated APs (e.g., APs 1501*a*, 1501*b*, 1501*c*) to set time for measurement feedback in an orthogonal way between BSSs of shared APs (e.g., AP 2 1501*b*, AP 3 1501*c*) (e.g., frequency or time). After each shared AP candidate (e.g., AP 2 1501*b*, AP 3 1501*c*) received the channel measurement from their associated STAs (e.g., STAs 1502*c*, 1502*d*, 1502*e*, 1502*f*), it may choose not to participate in the coordinated transmission in this TXOP. Otherwise, it may send the channel measurement information received from their associated STAs (e.g., STAs 1502*a*, 1502*b*) to the sharing AP (e.g., AP1 1501*a*) or a network controller for resource allocation and other decisions.

The above process can be repeated for each shared AP candidate (e.g., APs 1501*b*, 1501*c*), which may have committed to participated in the coordinated transmission during the process, starting from sending a sequence of NDPs to allow all STAs under those committing shared AP candidates in the network to make channel measurement. The order of the repeating process for shared AP candidates may be predetermined in the "Coordination Request" frame. However, any shared AP candidate may drop out from the candidate set (i.e., becoming non-committing shared AP candidate due too much interference) may change the order of repeating process, which may be communicated among APs vie backhaul link.

Figure 16:
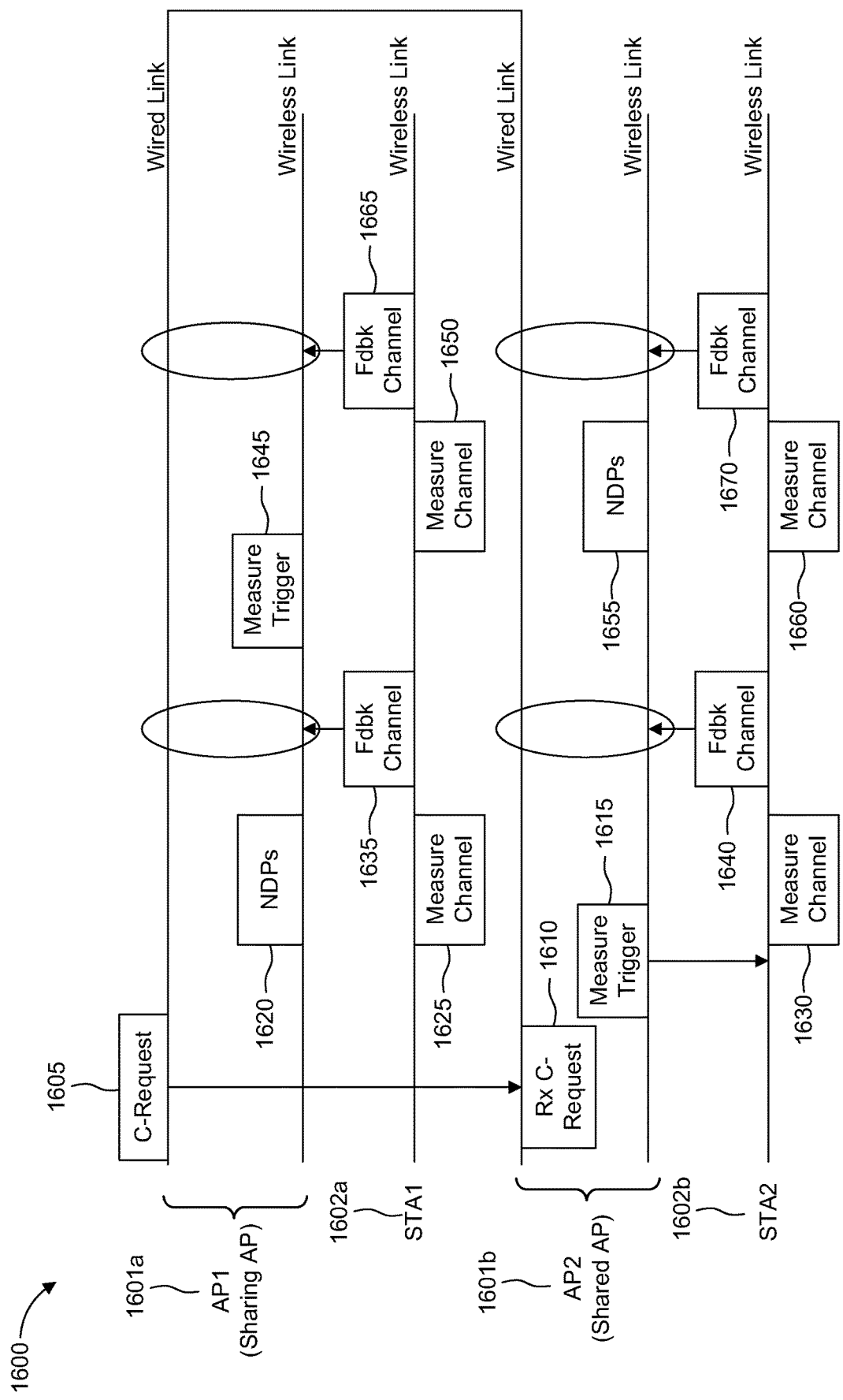
FIG. 16 is a diagram illustrating an example of Channel Sounding process with wired backhaul.

FIG. 16 illustrates an example of channel sounding procedure 1600 with wired backhaul, which may be used in combination with any of other embodiments described herein. As illustrated in FIG. 16, AP 1 1601*a* which is a sharing AP may transmit a coordinated multi-AP request frame 1605 to AP 2 1601*b* which is a shared AP via the wired link. The coordinated multi-AP request frame may include the information about the order of APs' transmission of NDPs that may be used for channel measurement for all STAs associated with different APs and the length of NDPs. In the example shown in FIG. 16, the AP 1 1601*a* transmits NDPs first and the AP 2 1610*b* transmits NDPs second. Before the AP 1 1601*a* sends NDPs, the AP 2 1601*b* sends a measurement trigger 1615 to its associated STAs so they will be ready to measure the channel by receiving NDPs transmitted from other APs, e.g., AP 1 1601*a*. The AP 1 1601*a* may send one or more NDPs 1620 to all STAs (e.g., STA 1 1602*a* and STA 2 1602*b*) that can measure the channel 1625 and 1630 respectively, via the wireless link. Any STAs, for example, STA 1 1602*a* and STA 2 1602*b*, that measure the channel based on NDPs sent from AP 1 1601*a*, may send feedback for the channel measurements to their associated APs, for example, STA 1 1602*a* to the AP 1 1601*a* and STA 2 1602*b* to the AP 2 1601*b* via the wireless link. The AP 1 1601*a* may send a measurement trigger frame 1645 to the STA 1 1602*a* via the wireless link so that the STA 1 1602*a* will be ready to measure the channel by receiving NDPs sent from the AP 2 1601*b*. The AP 2 1601*b* may send one or more NDPs 1655 to all STAs (e.g., STA 1 1602*a* and STA 2 1602*b*) that can measure the channel via the wireless link. The STA 2 1602*b* may measure its channel (s) 1660 and transmit the feedback for the channel measurements 1670 to the AP 2 1601*b* via the wireless link. The STA 1 1602*a* may measure its channel(s) 1650 and transmit the feedback for the channel measurements 1665 to the AP 1 1601*a* via the wireless link.

In FIG. 16, only one shared AP and one STA under each AP are considered as an example, but the number of APs and STAs are not limited. As illustrated in FIG. 16, "Measure Trigger" 4 "Measure Channel" 4 "Feedback Channel" is repeated from AP to AP. Since all APs shared the same backhaul link, there is no need to exchange channel measurement among those APs via wireless channels although they may be considered as additional links for higher reliability or low latency. It is noted that the FIG. 16 shows that channel feedback from STAs to APs takes place at the same time. In some embodiments, the channel feedback from STAs to APs may take place sequentially, for example, based on TDMA principle, using different frequency resources, and/or, based OFDMA principle.

It is noted that the "Coordination Request" may be a "Sounding Request" which starts the sounding process given an AP coordination set which includes one Sharing AP and one or more Shared APs.

It is noted that in this embodiment, the "wired" link between APs may be another wireless link/channel/band which is not the same as the wireless link/channel/band that used between APs and STAs.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a coordinating access point (CAP), the method comprising:

receiving, from one or more member access points (APs) in a multi-AP set (MAPS) comprising a plurality of member APs, one or more indications that the one or more member APs are capable of multi-AP sounding during a transmission opportunity (TXOP) acquired by the CAP;

transmitting, to the one or more member APs in the MAPS, a CAP TXOP indication (CTI) frame indicating that the multi-AP sounding is to be performed during the TXOP acquired by the CAP;

receiving, from the one or more member APs, a CAP TXOP request (CTR) frame indicating that the one or more member APs of the MAPS will perform the multi-AP sounding during the TXOP acquired by the CAP; and transmitting, to the one or more member APs, a CAP TXOP AP schedule (CTAS) frame indicating a transmission schedule for one or more sounding frames to be transmitted by the one or more member APs during the TXOP for the multi-AP sounding.

2. The method of claim 1, wherein the CTAS frame is transmitted as a response to the CTR frame.

3. The method of claim 1, wherein the CTAS frame is transmitted to one or more stations (STAs) associated with the one or more member APs.

4. The method of claim 1, wherein the CTAS frame includes at least one transmission resource that includes at least one of time information or frequency information allocated for the transmission schedule of the one or more sounding frames.

5. The method of claim 1, wherein the CTAS frame includes at least one transmission resource that includes an orthogonal sequence used for the transmission schedule of the one or more sounding frames.

6. The method of claim 1, further comprising:
determining, based on at least one of time information, frequency information, or an orthogonal sequence, the transmission schedule of the one or more sounding frames, wherein the time information, the frequency information, and the orthogonal sequence are included in the CTAS frame.

7. The method of claim 1, further comprising:
transmitting, to the one or more member APs in the MAPS, another CTI frame indicating that multi-AP sounding feedback is to be performed during another TXOP acquired by the CAP.

8. The method of claim 1, wherein the TXOP is a shared TXOP being a time period that the one or more sounding frames are to be transmitted by the one or more member APs according to the transmission schedule.

9. A coordinating access point (CAP) comprising:
a processor;
a receiver; and
a transmitter,
the processor and the receiver configured to receive, from one or more member access points (APs) in a multi-AP set (MAPS) comprising a plurality of member APs, one or more indications that the one or more member APs are capable of multi-AP sounding during a transmission opportunity (TXOP) acquired by the CAP;
the processor and the transmitter configured to transmit, to the one or more member APs in the MAPS, a CAP TXOP indication (CTI) frame indicating that the multi-AP sounding is to be performed during the TXOP acquired by the CAP;
the processor and the receiver configured to receive, from the one or more member APs, a CAP TXOP request (CTR) frame indicating that the one or more member APs of the MAPS will perform the multi-AP sounding during the TXOP acquired by the CAP; and
the processor and the transmitter configured to transmit, to the one or more member APs, a CAP TXOP AP schedule (CTAS) frame indicating a transmission schedule for one or more sounding frames to be transmitted by the one or more member APs during the TXOP for the multi-AP sounding.

10. The CAP of claim 9, wherein the CTAS frame is transmitted as a response to the CTR frame.

11. The CAP of claim 9, wherein the CTAS frame is transmitted to one or more stations (STAs) associated with the one or more member APs.

12. The CAP of claim 9, wherein the CTAS frame includes at least one transmission resource that includes at least one of time information or frequency information allocated for the transmission schedule of the one or more sounding frames.

13. The CAP of claim 9, wherein the CTAS frame includes at least one transmission resource that includes an orthogonal sequence used for the transmission schedule of the one or more sounding frames.

14. The CAP of claim 9, wherein the processor is configured to determine, based on at least one of time information, frequency information, or an orthogonal sequence, the transmission schedule of the one or more sounding frames, wherein the time information, the frequency information, and the orthogonal sequence are included in the CTAS frame.

15. The CAP of claim 9, wherein the processor and the transmitter are configured to transmit, to the one or more member APs in the MAPS, another CTI frame indicating that multi-AP sounding feedback is to be performed during another TXOP acquired by the CAP.

16. The CAP of claim 9, wherein the TXOP is a shared TXOP being a time period that the one or more sounding frames are to be transmitted by the one or more member APs according to the transmission schedule.

* * * * *